Aug. 18, 1953 W. R. SPILLER 2,649,155
SHEET HANDLING MECHANISM FOR CUTTING MACHINES
Filed Feb. 24, 1947 9 Sheets-Sheet 1
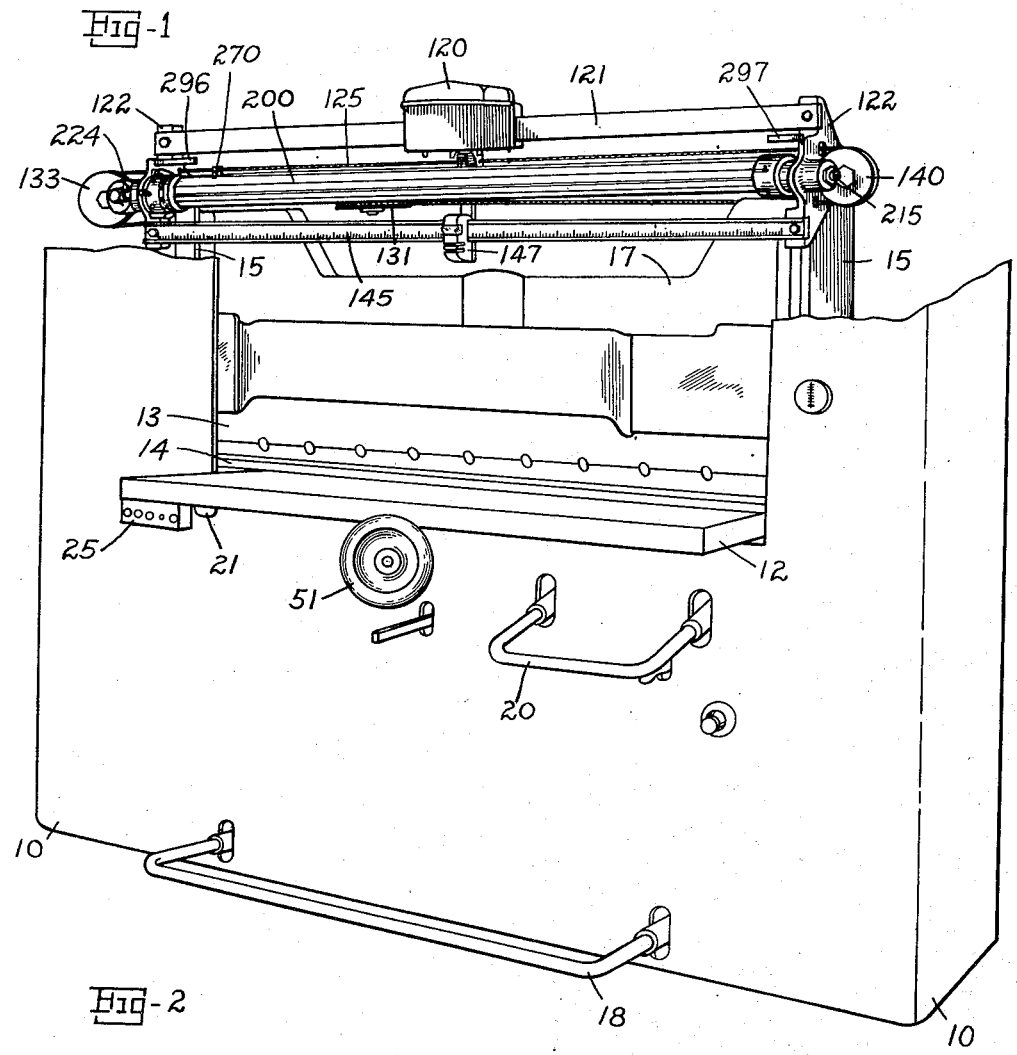
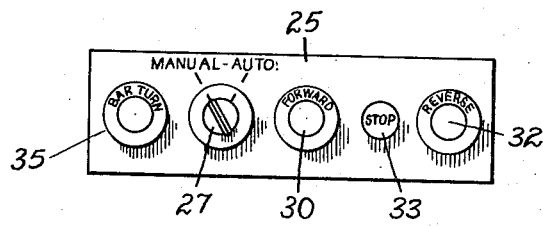
Inventor
William R. Spiller
By
Marechal & Biebel
Attorneys Aug. 18, 1953  W. R. SPILLER  2,649,155
SHEET HANDLING MECHANISM FOR CUTTING MACHINES
Filed Feb. 24, 1947  9 Sheets-Sheet 2

Inventor
William R. Spiller
By Marechal & Biebel
Attorneys

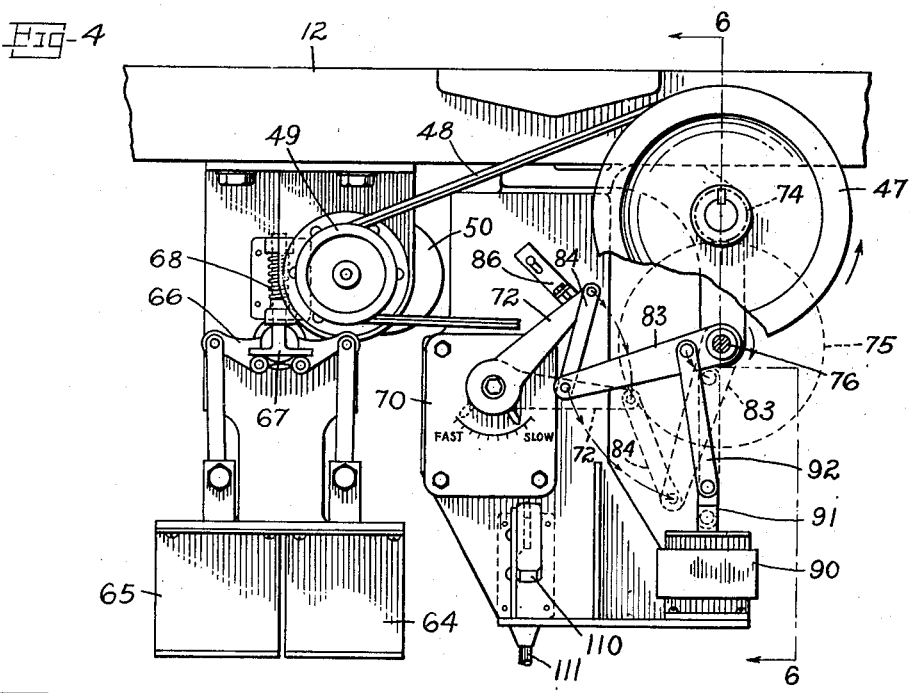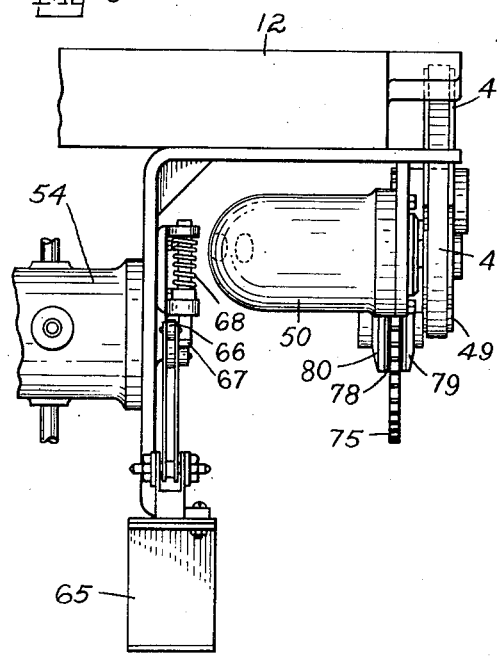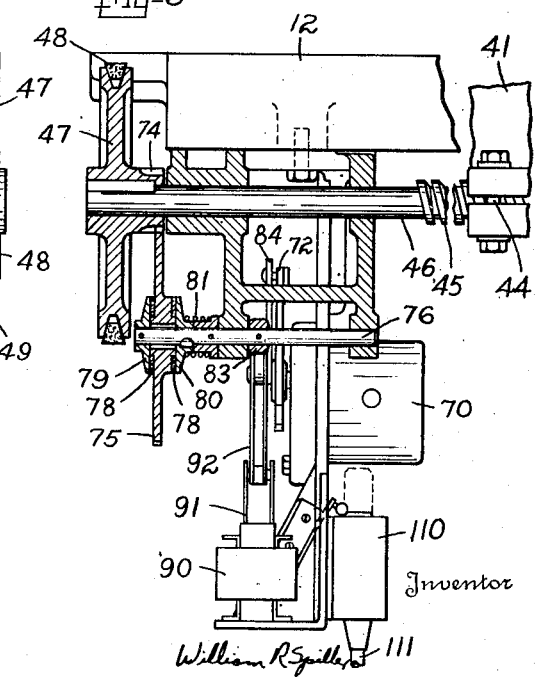

Aug. 18, 1953  W. R. SPILLER  2,649,155
SHEET HANDLING MECHANISM FOR CUTTING MACHINES
Filed Feb. 24, 1947  9 Sheets-Sheet 4

Inventor
William R. Spiller
By
Marechal & Biebel
Attorneys

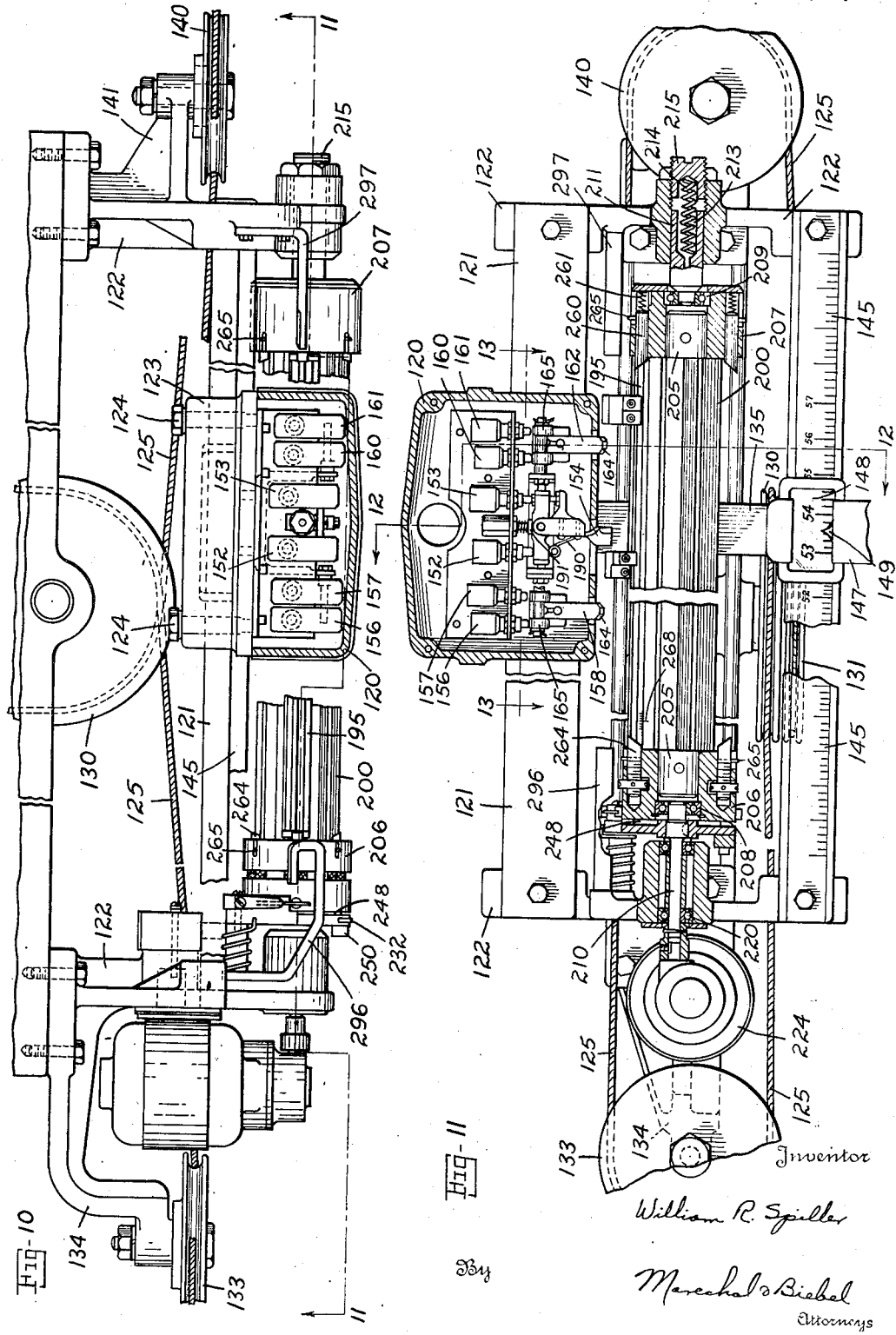

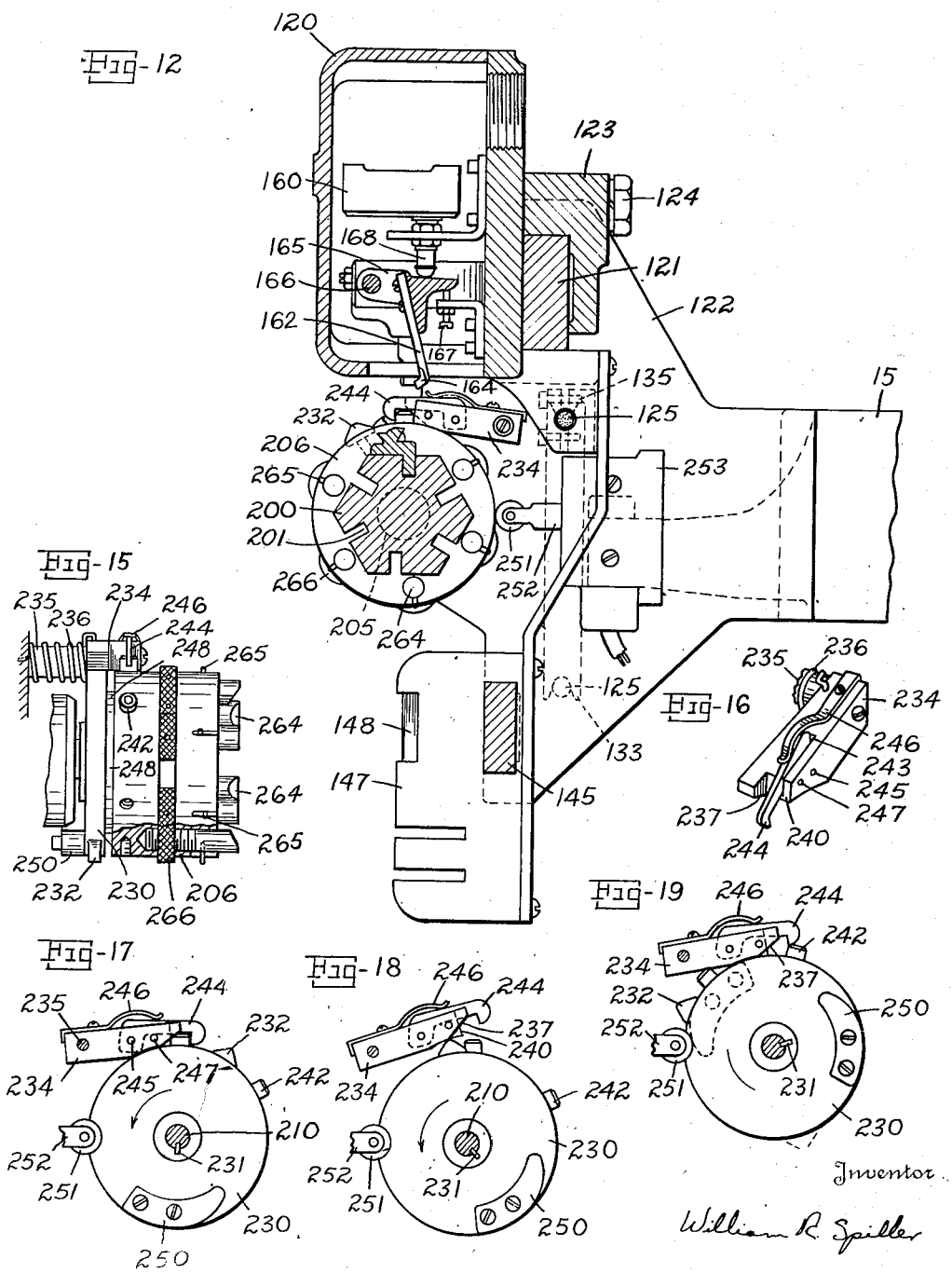

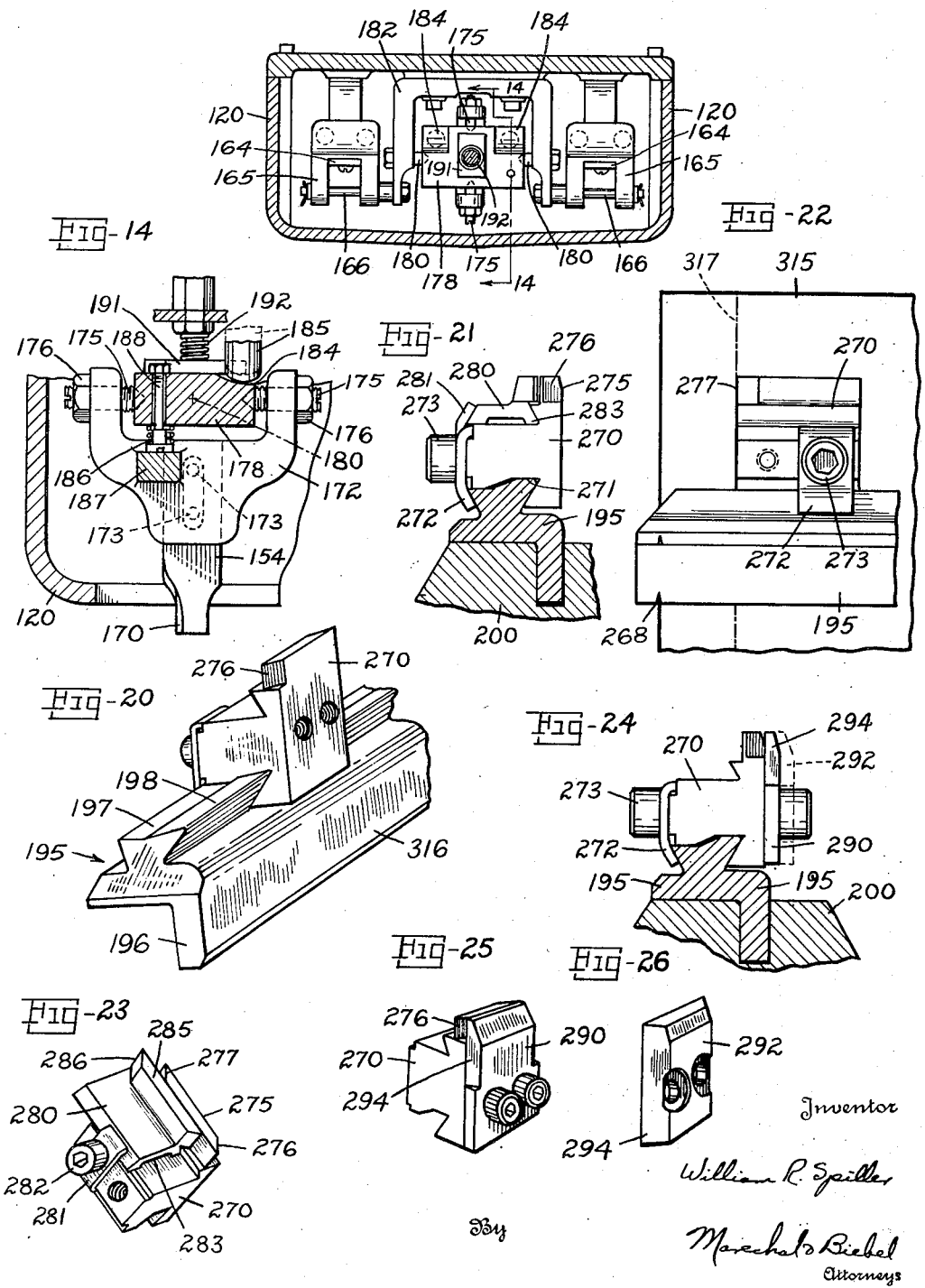

Aug. 18, 1953 — W. R. SPILLER — 2,649,155
SHEET HANDLING MECHANISM FOR CUTTING MACHINES
Filed Feb. 24, 1947 — 9 Sheets-Sheet 8
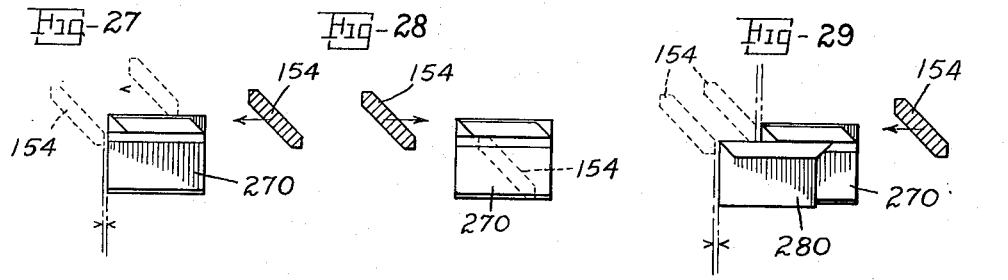
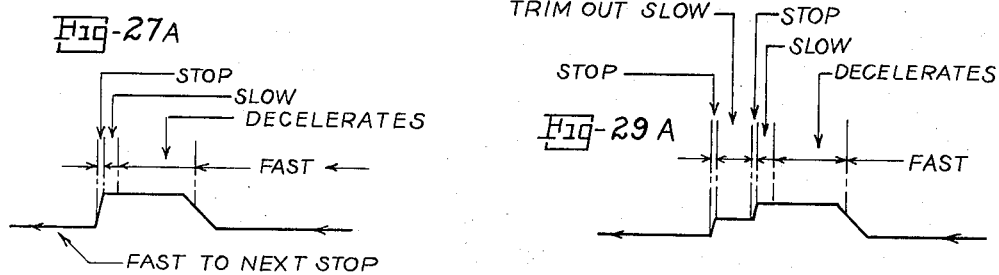
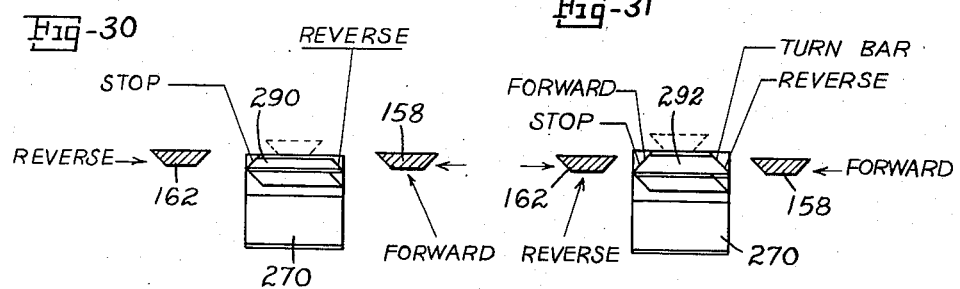
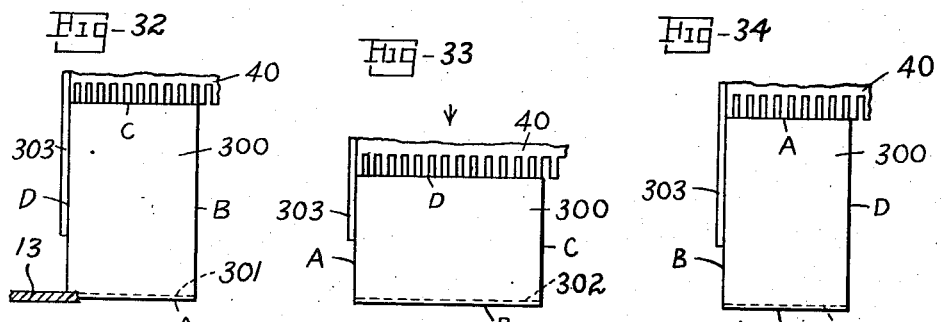
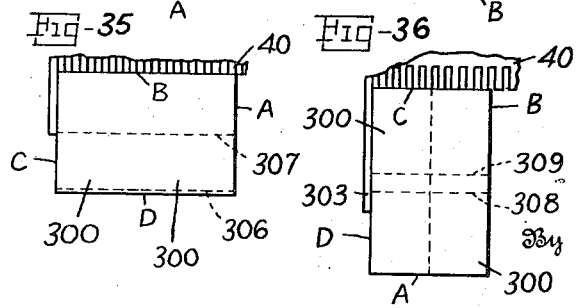
Inventor
William R. Spiller
By Marechal & Biebel
Attorneys Aug. 18, 1953  W. R. SPILLER  2,649,155
SHEET HANDLING MECHANISM FOR CUTTING MACHINES
Filed Feb. 24, 1947  9 Sheets-Sheet 9
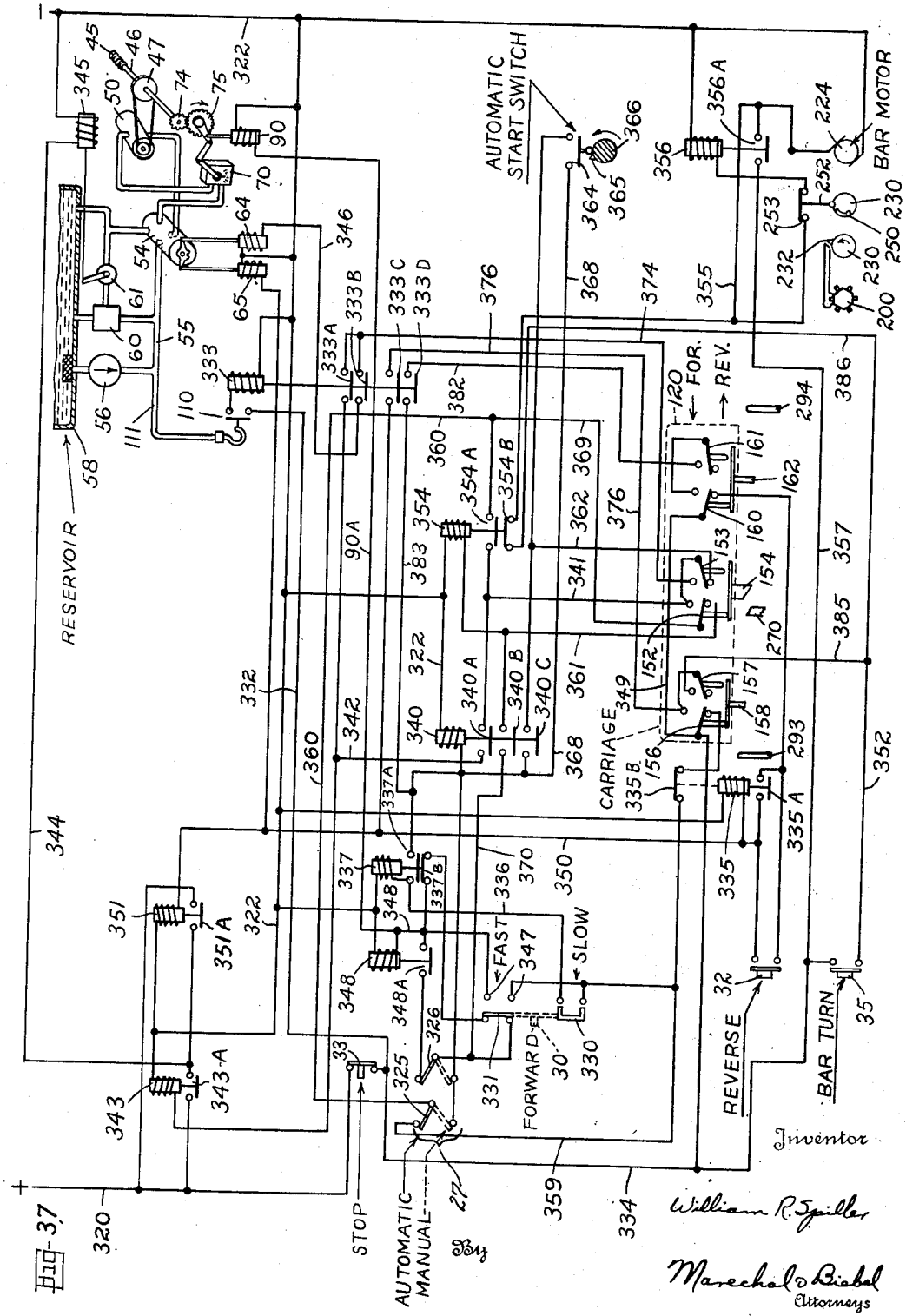

Patented Aug. 18, 1953

2,649,155

UNITED STATES PATENT OFFICE 2,649,155

SHEET HANDLING MECHANISM FOR CUTTING MACHINES

William R. Spiller, Dayton, Ohio, assignor to Harris-Seybold Company, Dayton, Ohio, a corporation of Delaware Application February 24, 1947, Serial No. 730,273

37 Claims. (Cl. 164—59)

This invention relates to a machine for the handling of paper and like sheet material such as a cutter and a spacer.

It is the principal object of the invention to provide a mechanism adapted for use in the cutting of paper and like sheet material which is rapid and efficient in use, which affords a maximum of flexibility and ease of adjustment for the handling of different types of work, and which also affords a high degree of safety for the operator.

It is also an object to provide a paper cutter mechanism in which the back gage can be controlled to operate automatically from any position on the work table to any other position through any desired pattern of steps of movement including movement both forwardly and rearwardly as desired for the particular handling of the work material.

It is also an object to provide such a machine in which the make-up time required to predetermine the pattern of operation of the machine for the particular sequence desired is materially shortened and the entire make-up and adjustment procedure greatly simplified.

It is also an object to provide such a machine in which the make-up can be effected by direct application of the control members to the work itself, or to a scale separate and apart from the machine itself, allowing the machine to be used for regular cutting operations during the making of such adjustments.

It is also an object to provide a machine of this character in which a high rate of forward travel of the back gage is provided and in which the slowing down of the back gage in preparation for the stopping thereof is accomplished under controlled deceleration to avoid having the work travel away from the gage at any time.

It is a further object to provide such a machine in which the stopping of the back gage is accurately controlled so that it will consistently come to a desired rest position.

It is also an object to provide a paper cutter having a power operated back gage which can be rapidly and accurately set by manual push button control in any desired position for a particular work operation.

It is also an object to provide such a machine having control rods, a plurality of which may be utilized to establish a desired sequence of movements, and which may be readily handled and conveniently stored individually or as a group when not in use to retain a particular setup for the work desired.

It is a still further object to provide a machine in which the control of the back gage is effected automatically by means of stops and control members movable relative thereto in relation to the position of the back gage and in which provision is made for preventing undesired control in response to accidental actuation of such control members.

It is another object to provide a turret head for receiving a plurality of control rods which are sequentially brought into control position for controlling the back gage in both forward and rearward movements either automatically upon actuation of the cutting knife or in response to manual actuation.

It is a still further object to provide for starting the operation of the back gage through a relay and for thereafter excluding the relay to provide for direct control of the stopping of the back gage by a feeler control which affords a high degree of accuracy in its final stopped position.

Other objects and advantages will be apparent from the following description, the accompanying drawings, and the appended claims.

In the drawings:

Fig. 1 is a view in perspective from the front of the machine with the upper portion of the housing being broken away to more clearly show the construction;

Fig. 2 is a detail view in elevation of the control panel on the front of the machine;

Fig. 4 is a view in elevation from the rear of the machine on an enlarged scale and also showing the operating and control mechanism for the back gage;

Fig. 5 is a view in elevation of the same mechanism shown in Fig. 4 as viewed from the left hand side thereof;

Fig. 6 is a vertical sectional view on the line 6—6 of Fig. 4;

Fig. 10 is a top plan view with certain parts being broken away showing the arrangement of the automatic controls in the control carriage on the face of the machine for controlling the operation of the back gage;

Fig. 11 is a vertical sectional view through the control carriage and the turret bar substantially on the line 11—11 of Fig. 10, certain of the mechanism being shown in section to better show the construction thereof;

Fig. 12 is a vertical sectional view through the control carriage on the line 12—12 of Fig. 11;

Fig. 13 is a horizontal sectional view through the control carriage on the line 13—13 of Fig. 11;

Fig. 14 is a detail vertical sectional view on the line 14—14 of Fig. 13 showing the construction of the center one of the feeler arms and its control assembly;

Fig. 15 is a detail view in elevation of the adjustment mechanism at the drive end of the rotary turret head;

Fig. 16 is a partial perspective view of the stop mechanism for the rotation of the turret head;

Fig. 17 is a somewhat schematic view showing the final or locked position of the mechanism for rotating the turret head;

Fig. 18 is a view showing the same mechanism in an intermediate position of operation with the turret head rotating;

Fig. 19 is a view showing the turret head mechanism about to complete an advancing movement, the dotted line position showing the effect of continued rotation by the drive member;

Fig. 20 is a view in perspective of one of the control or stop rods which is removably received within the turret head with a standard stop in position thereon;

Fig. 21 is a sectional view through the turret head with one of the stop rods in place therein and a standard and a trim-out stop located on the rod;

Fig. 22 is a view in elevation showing a control rod in direct contact with the work and properly aligned with the edge thereof, a standard stop being positioned on the rod in direct relation to a line on the work at which it is desired to produce a cut;

Fig. 23 is a view in perspective of a trim-out stop assembled on a standard stop;

Fig. 24 is a sectional view of a typical stop used at the end of the rod, showing a standard stop together with a thin stop in full lines and a thick stop in dotted lines;

Fig. 25 is a view from the right hand side of the stop assembly of Fig. 24;

Fig. 26 is a perspective view of a thick stop;

Fig. 27 is a diagrammatic view showing the operative relationship as the central feeler arm engages a standard stop member;

Fig. 27A is a schematic view of the control operations which ensue from the engagement of the feeler arm in the pattern shown in Fig. 27;

Fig. 28 is a schematic view showing the action of the center control finger in passing the opposite side of the standard stop during reverse travel of the back gage;

Figs. 29 and 29A are similar views illustrating the action of a standard stop together with a trim-out stop;

Fig. 30 is a diagrammatic view showing the relationship between the end feeler arms and the foremost and rearmost stops on the rod, the stop in this case being a thin stop;

Fig. 31 is a diagrammatic view showing the relationship between the end feeler arms and the foremost and rearmost stops on the rod, the stop in this case being a thick stop;

Figs. 32 to 36 are diagrammatic views showing a typical sequence of operations in the cutting of a pile of sheet material according to a definite pattern; and Fig. 37 is a schematic diagram showing the hydraulic and electric control circuits of the machine.

Figure 3:
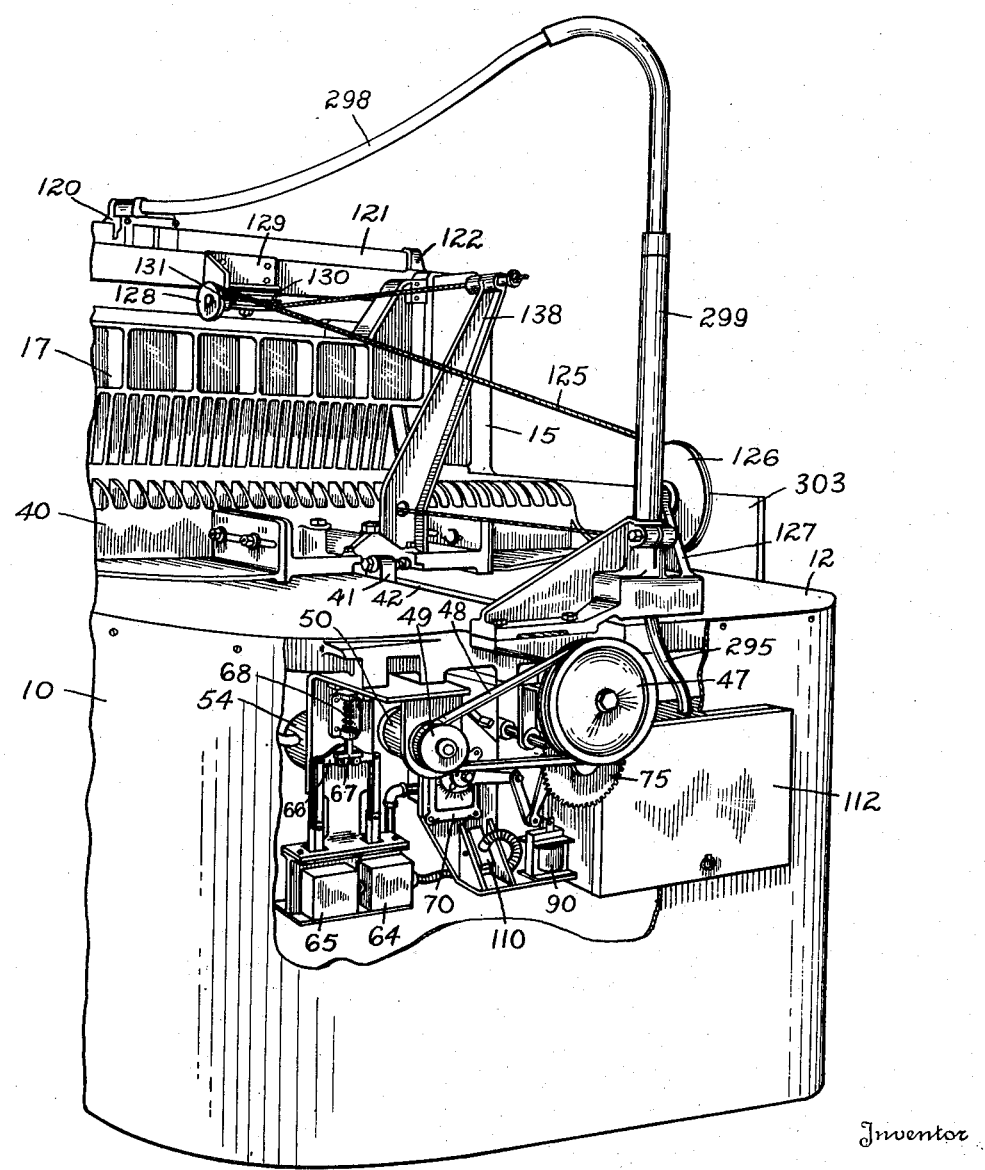
Fig. 3 is a perspective view from the rear of the machine with a portion of the housing being broken out to show the drive and the speed control mechanism for operating the back gage.

Referring to the drawings which show a preferred embodiment of the invention, Fig. 1 shows a front perspective view of a paper cutting mechanism constructed in accordance with the present invention. A housing 10 surrounds the machine which is preferably of the construction shown and described in copending application, Serial No. 654,157, filed March 13, 1946, now Patent No. 2,599,591, and assigned to the same assignee as this application.

The work table is shown at 12, above which is the knife bar 13 carrying the knife 14, the knife bar being mounted in the side frames 15 for reciprocal movement relative to the cutting table. The clamp 17 is located directly behind the knife and is controlled independently of the knife by foot treadle 18. A complete cutting cycle of the knife with concurrent actuation of the clamp is produced in response to the actuation of hand control lever 20, accompanied by simultaneous manual actuation of control button 21 which thus requires both hands of the operator to be occupied as a safety measure.

The clamp 17 is preferably actuated by hydraulic power means and the knife by a mechanical drive, as described in said copending application. Further, the operation of the back gage is preferably interlocked with the knife and clamp as described in said application so that actuation thereof, and of the back gage, are mutually exclusive.

In accordance with the present invention, the back gage is arranged to be power operated by means of a hydraulic motor or drive. The machine can be selectively conditioned for manual control of the back gage where for example the operator desires to control the position of the back gage manually for any particular operation. When however automatic control is desired, i. e., to have the machine operate as a spacer, it is only necessary for the operator to throw a control to the automatic position, as a result of which the control of the back gage takes place automatically in accordance with a predetermined pattern. Following each cutting stroke of the knife, the back gage automatically progresses to the next position in the sequence as established. This may be a short forward movement as in making a trim-out, in which event the back gage moves forward at slow speed, stopping accurately at the desired position. It may be a movement of substantial length which the back gage traverses at high or fast speed, slowing down as it approaches the final position and finally moving into that position at slow speed and stopping accurately at the desired location. This may be repeated in as many steps as desired, and following the final cutting operation of that series the work is moved forward toward the operator so that he can handle it for a subsequent series of steps without having to reach beneath the knife in doing so.

Thereafter the gage automatically reverses to a rearward position, and again moves forwardly in the same or a different pattern of stops each properly positioned for the subsequent cutting step. In this way a complete sequence of cutting steps is performed at high speed, and with all of the operations taking place automatically and with a high degree of accuracy.

The invention further provides for a controlled deceleration of the back gage while transferring from high speed to slow speed, to establish and maintain as high a deceleration rate as practicable, thus shortening the distance traveled by the gage during deceleration, while at the same time avoiding uneven or jerky motions such as might cause the work material to pull away from the gage with resulting uncertainties and inaccuracies in the work. The controlled deceleration thus provides for maintaining high speed operation and minimum spacing between successive fast operations of the gage, and assures that the pile of work material will at all times remain in contact with the gage so that complete accuracy of operation and positioning of the pile are assured.

The selective control panel 25 for manual control of automatic operation is located at the front of the machine and preferably at the left hand side and below the work table. As shown in Fig. 2 it embodies a two-position switch 27 which is thrown either to the "Manual" or to the "Automatic" positions as indicated. When the control is in "Automatic" position, the movement of the back gage is controlled automatically in relation to the operation of the cutting knife as described above.

When in the "Manual" position, there is no direct correlation or automatic operation of the back gage following a cutting stroke except for the interlocking action referred to above which prevents simultaneous operation of the back gage, particularly on a forward movement, with operation of either the clamp or the knife. The back gage is moved forward by power operation in response to pressing the control button 30 marked "Forward." This control has two positions, one a partial depression in which the back gage moves forwardly at slow speed, and the other a full depression which causes the back gage to move forwardly at high speed. Forward operation in either case continues only as long as the control button is held in depressed position against a spring which normally biases it to outward or off position. Thus forward motion of the back gage can be stopped at any time by merely releasing button 30.

Because the rearward travel of the back gage does not ordinarily require the operator's attention and is usually less likely to result in danger or damage to the work, provision is made for manual control of the rearward movement by pressing "Reverse" button 32 which however results in continuing rearward movement of the back gage to the rearward limit of its position. If it is desired to stop such rearward movement, stop button 33 may be depressed with resulting stoppage of such rearward movement. It is also noted that when operating automatically, movement of the back gage in either direction will be stopped by pressing stop button 33.

Another button 35 marked "Bar Turn" is positioned on the control panel and is thus in position to be actuated by the operator to cause the turning of the turret bar and the selection of a new series of stops, under manual control when this is desired.

Referring now to the mechanism more in detail, and more particularly to Figs. 3 to 6, the back gage is shown in rear perspective at 40, having an arm 41 extending downwardly through a slot 42 in the center of the work table. Arm 41 carries a nut 44 which engages a screw thread 45 formed in the drive shaft 46, providing for the movement of the back gage forwardly and rearwardly in response to rotation of the shaft. A pulley wheel 47 is keyed to shaft 46 and is driven by a V-belt 48 from drive pulley 49 on the shaft of the hydraulic motor 50. A hand wheel 51 is mounted on shaft 46 and is located at the front of the machine below the work table to permit manual adjustment of the back gage.

Figure 8:
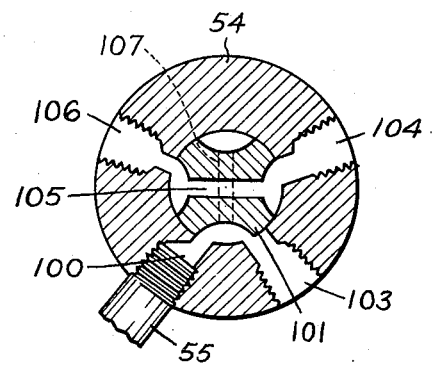
Figs. 8 and 8A are views corresponding to Figs. 7 and 7A with the control valve in the position for forward travel of the back gage.
Figure 8A:
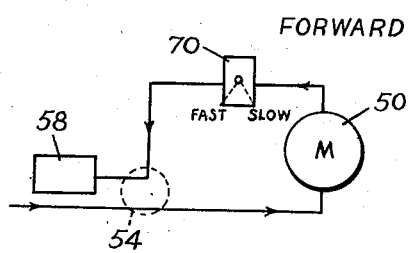
Figure 9:
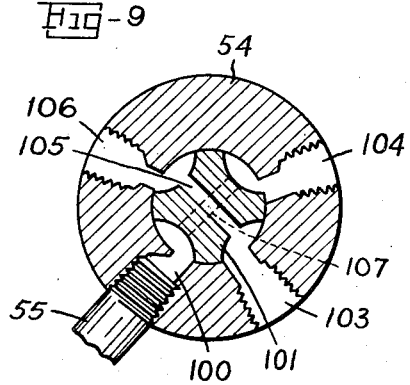
Figs. 9 and 9A are views corresponding to Figs. 7 and 7A with the valve in position for reverse operation of the back gage.
Figure 9A:
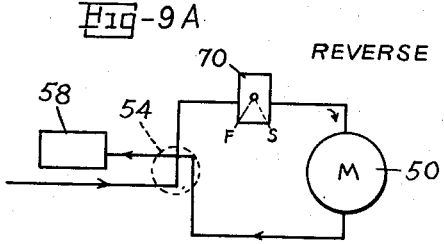

The directional control of the back gage motor is effected by a directional or reversing valve 54 (Fig. 5) which is supplied with pressure fluid through pressure line 55 from pump 56 (Fig. 37) which receives its fluid from a suitable reservoir 58 (Figs. 8A, 9A and 37). A suitable pressure control 60 actuated by pilot control valve 61 is provided for establishing a suitable operating pressure to actuate the back gage motor. Actuation of the control valve 54 from its forward to its reverse position is accomplished by means of two solenoids 64, 65, which are adapted to be selectively energized to rock the yoke 66 against the pressure of a yieldable foot 67 which is spring urged by spring 68 to return the valve to neutral position when both solenoids are de-energized.

The rate of travel of the back gage is controlled by a flow control or metering valve 70 which is included in the path of flow of the fluid through the motor, being located between the motor 50 and the reversing valve 54. This valve 70 is of such characteristics that the flow therethrough is directly proportional to the angular position of the valve lever 72 which is mounted on the outside of the valve and arranged to swing from one position where the valve is wide open providing for fast travel to another position approximately 90° therefrom which is marked "slow." Thus it follows that the rate of turning of this valve will also determine the rate of change of the flow of fluid therethrough, and turning of the valve arm at a substantially constant rate from "fast" to "slow" will thus establish a uniform controlled deceleration in the rate of rotation of the back gage motor and hence in the rate of travel of the back gage itself. A suitable valve for this purpose is that identified as a Vickers flow control valve.

To control the movement of this valve lever 72, and to correlate its movement with that of the back gage itself, the hub of pulley 47 is formed with gear teeth 74 (Fig. 6) thereon which mesh with a gear wheel 75 loosely mounted on shaft 76 carried in the rear frame of the machine. Gear wheel 75 has a friction face or hub 78 which operates between friction disks or flanges 79, 80, these flanges being spring pressed into frictional engagement therewith by means of compression spring 81. The flanges 79, 80 are secured to shaft 76 and thus drive the shaft when they are rotated by the friction surface 78. A lever 83 is pinned to shaft 76 and rotates therewith in response to rotation of the shaft. A floating link 84 connects the lever 83 with the valve lever 72.

When the back gage motor is rotating to cause forward movement of the back gage, the direction of rotation of pulley 47 is counterclockwise as shown by the arrow in Fig. 4. This results in a tendency for the shaft 76 to turn in a clockwise direction, under the friction drive established at the friction face 78, swinging the lever system 83, 84, 72, into the full line position shown where lever 72 abuts against an adjustable stop 86. The control valve 70 is thus placed in the slow position where it tends to remain as long as forward motion of the back gage continues.

It will be evident that in response to reverse rotation of the back gage motor to cause reverse movement of the back gage, the opposite conditions will be established and the valve will be turned by the friction drive to the fast position, the friction clutch slipping after this position of the linkage is reached to maintain the valve in such position providing the continued fast return movement of the back gage.

In order to provide for fast forward movement of the back gage, a solenoid 90 is provided having an armature 91 to which link 92 is connected, this link having a connection with lever arm 83 as shown in Fig. 4. In response to energization of the solenoid 90 and attraction of its armature, lever 83 will be pulled toward and retained in the fast position; as soon as the solenoid is de-energized, the forward movement of the back gage will cause immediate return of the valve toward its slow position.

Analysis of the linkage mechanism described above will show that as it travels from its fast to its slow position, the valve arm 72 moves through increasingly greater angles for equal increments of movement for the control shaft 76. However shaft 76 is directly connected, and its movement is thus directly proportional, to the rate of travel of the back gage. Thus in decelerating, as the back gage slows down, the rate of travel of shaft 76 decreases but by reason of the increase in the effective ratio of the lever arm mechanism, the motion of valve lever 72 continues at a substantially uniform rate. The movement of the valve is thus affected by the movement of the back gage itself, and while the back gage decelerates to its slow rate of speed, the rate of change of the valve takes place in a substantially uniform manner with corresponding controlled deceleration of the back gage itself, providing for the slowing down of the back gage in a minimum, and substantially constant distance, but at the same time with assurance that the work material will not travel away from the gage, causing improper positioning and handling of the work. It will be evident that the actual rate of deceleration may be varied by changing the ratio of gear 74 to gear 75.

As an example, the fast rate of travel of the machine in forward may be of the order of 35 to 40 feet per minute, the deceleration at a rate of the order of 200 to 240 feet per minute per second and the slow speed about 1 to 1½ feet per minute.

Figure 7:
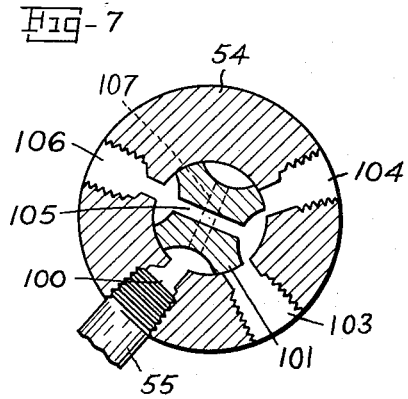
Fig. 7 is a sectional view through the directional valve for controlling the back gage motor with the valve in neutral position.
Figure 7A:
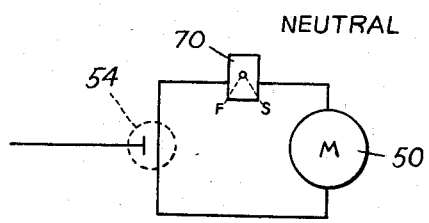
Fig. 7A is a diagrammatic view of the hydraulic circuit corresponding to the condition in the system when the valve is in the neutral position as shown in Fig. 7.

Referring to Figs. 7 and 7A, the reversing valve 54 is shown diagrammatically in the neutral position to which it is biased by the presser foot 67. Fluid under pressure is supplied through port 100 while adjustable valve body 101 is set in blocking position so that no fluid flow takes place.

Referring to Figs. 8 and 8A, the conditions are shown when the valve is set for forward operation of the back gage. The valve body 101 is turned so that fluid from supply connection 100 flows through port 103 to the fluid motor and from the motor back through metering valve 70 to port 104, through a central passage 105 in the valve body and is discharged back to the reservoir. Under these conditions the motor operates in the forward direction at either slow or fast speed, depending upon the setting of the metering valve.

Referring to Figs. 9 and 9A, the valve is shown in the position providing for reverse flow of the fluid. The fluid from the pressure connection 100 travels through a passage 107 in the valve body 101 and out of pressure connection 104, to the metering valve 70 which in this condition is maintained in the fast position, then to the motor, from the motor back to the valve through passage 103, passage 105, port 106, and back to the reservoir. Since there is usually less flow resistance in this type of metering valve 70 for reverse flow of fluid, the speed in reverse may be approximately 55 to 60 feet per minute.

A pressure responsive switch is also preferably provided in the control circuit to prevent actuation of the back gage controls unless there is a fluid operating pressure in the system. The switch is shown at 110 (Fig. 37), connection being made thereto from pump 56, through line 111. The switch 110 is conveniently located on the same support which carries the speed control valve 70 (Fig. 4). The relays and other electrical equipment are preferably located within control box 112 accessible from the rear of the machine.

To provide for automatic control of the movement of the back gage, a control carriage 120 is mounted for sliding movement on a bar 121 suitably carried on brackets 122 at the upper ends of the side frames 15 of the machine. The carriage 120 is slidably secured in position on the bar by means of bracket 123 and bolts 124, provision being made for moving the carriage in direct relation with the movement of the back gage. For this purpose a cable 125 is secured to the back gage, the cable extending toward the rear of the machine where it passes around a pulley 126 suitably mounted upon a stationary bracket 127, the cable then traversing a pulley 128 carried on the side of a bracket 129 secured to the cross-bar 122. Bracket 129 in addition carries a pair of pulleys 130 and 131, cable 125 passing over the upper pulley 130 and toward the left hand end of the machine as seen from the front thereof. Here the cable passes around a pulley 133 supported on bracket 134, and is then fastened to a bracket 135 which is secured to the housing 120 of the carriage proper.

The other end of the cable 125 is connected to an upwardly extending arm 138 which is secured to and directly movable with the back gage, cable 125 passing around the lower pulley 131 and extending toward the opposite or right hand side of the machine. Here it passes around a pulley 140 supported on bracket 141, and returns to the bracket 135 of the carriage 120, a single cable thus sufficing for moving the carriage in both directions. This cable is relatively tight and thus provides for direct movement of the control carriage 120 across the front of the machine in accurate correlation with both the forward and return movements of the work carriage.

A scale 145 is suitably secured on brackets 122 in position below and parallel with bar 121 and is marked with a scale which is direct reading in connection with the movements of the back gage. The bracket 135 carried by carriage housing 120 extends downwardly behind the scale 145 and supports a housing 147 thereon in which there is mounted a magnifying lens 148 directly in front of the scale and which also carries a pointer 149 to enable the position on the scale to be accurately read. Preferably an illuminating means is also included in housing 147 to facilitate the reading of the scale.

The carriage 120 contains three pairs of control switches with each pair arranged to be actuated by a separate feeler arm. The central pair is shown at 152, 153 (Figs. 10 and 11) with the feeler arm for the actuation thereof being shown at 154. The left hand pair of switches, i. e., those which are actuated at the end of the forward stroke of movement are shown at 156, 157, with the feeler arm 158 providing for the actuation thereof. The remaining pair of switches, 160, 161, provide for the control of the carriage at the rearward portion of its travel, and are actuated by feeler arm 162.

It will be noted that the two switches of each pair are set at different elevations with respect to each other, and therefore will respond to different degrees of displacement of the feeler arms. Thus a limited displacement of any one of the feeler arms will actuate only one of its switches, i. e., the lower one, while a full displacement will result in the actuation of both of these switches. The switches are preferably of the quick make and break type and are single-pole double-throw switches so that they have two make positions, but each switch is biased so that it will remain in one of its circuit closing positions, referred to as its normal position, except when the corresponding feeler arm is actuated by one of the stops. If desired switches 157 and 161 may be single-pole single-throw switches normally biased to circuit opening position.

The end feeler arms 158 and 162 are similar and the lower ends of each of these arms are beveled on both sides as indicated at 164, each such arm being mounted on a bracket 165 for swinging movement about pivot 166 within the carriage 120. An adjustable stop 167 determines the normal position of the feeler arm. In response to actuation by one of the stops, the arm is cammed rearwardly, raising the bracket 165 against the operating stem 168 of the appropriate switch, illustrated in Fig. 12 as switch 160, it being understood however that bracket 165 on the right of Fig. 11 provides for operation of both switches 160 and 161 in sequence, and in accordance with the amount of displacement of the feeler arm, in the manner described above.

It is desirable to mount the central feeler arm 154 on a universal mounting to provide for complete freedom of swinging movement thereof during the reverse travel of the back gage and of the control carriage, thereby allowing it to clear the several stops without damage or interference. Feeler arm 154 as shown in Fig. 14 is in the shape of a flat strip which is twisted at an angle of approximately 45°, and the ends of which are suitably beveled as shown at 170. To provide for the universal mounting of feeler arm 154 it is mounted for vertical adjustment in a yoke 172 by means of clamping screws 173. The yoke 172 carries a pair of pivot pins 175 suitably held in position by means of nuts 176, the pointed ends of the pins facing each other to rockingly support a bracket 178. This bracket is in turn pivotally mounted on a pair of pins 180 which extend at right angles to the pins 175, and which are suitably mounted in U-shaped member 182 secured to the back wall of the control carriage 120.

Bracket 178 has two switch engaging portions 184 which are located immediately below the switch pins 185 of the two switches 152 and 153. As previously described the switches are mounted at different elevations such that it requires a greater rocking movement of the feeler arm 154 and the yoke 178 to actuate one switch than the other. The feeler arm is normally biased to a normal position by means of spring 186 which acts between the bracket 178 and a projection 187 of yoke 172, a central stop pin 188 freely receivable in bracket 178 providing for limiting the movement of the bracket under the action of this compression spring. A torsion spring 190 (Fig. 11) tends to rock bracket 172 on pins 175 against the action of spring 186 but the latter is stronger and thus overcomes the torsion spring. A presser foot 191 yieldably engaged by spring 192 tends to maintain the bracket in a neutral position while allowing freedom of rocking movement thereof when the feeler arm engages any of the stops during its travel or when manually displaced in setting a stop to correspond with an actual position of the carriage.

From this construction it will be evident that feeler arm 154 is free to move in two directions at right angles to each other as required to clear the stop pins, and will be engaged and actuated by the stop pins during the forward travel of the back gage and of the control carriage 120, causing selective actuation of its two control switches 152, 153, depending upon the extent of the displacement produced.

It is desired to provide for ease of adjustment and to facilitate the make-up operation in connection with the pre-setting of the machine to carry out any particular sequence of automatic operations. For this purpose the stops are adapted to be assembled and properly located on individual stop receiving rods, each stop being capable of being separately mounted on and removed from the rod without disturbing the position or assembly of the remaining stops on that rod. Further, provision is made for the mounting of a group of rods, up to six in number in the embodiment shown, as required to cause the back gage to follow different patterns of the work. The several rods are removably received upon a turret head which is rotatable under both manual and automatic control, providing for bringing each of the rods successively into operative relation with the control feeler arms.

Further, the rods and the stops assembled thereon are relatively light in weight and inexpensive, so that it is advantageous and commercially practicable to provide a group of such rods with the stops assembled thereon to remove such group of rods when a particular work operation is completed, and to retain that group of rods for that particular work operation, rather than to attempt to relocate the stops on a single set of rods to enable the machine to handle different work. This greatly facilitates the make-up time since having once set the stops on a set of rods, it is only necessary to place the rods in the turret head, whereupon the machine is ready for operation in accordance with the pattern determined by that set of stops.

The stop receiving rod is shown in Fig. 20 at 195, and is provided with a depending flange portion 196 adapted to be received in one of the slots on the turret bar to retain the rod in place. On its upper side, and for the purpose of receiving the individual stops thereon, it is formed with a wedge-shaped or dovetail portion 197 the rearward wing 198 of which is somewhat raised and rounded as indicated.

The turret bar is shown at 200 (Figs. 10 to 12), having the series of slots 201 therein to receive the respective flanges 196 of the rods 195. As indicated, the turret bar 200 is shown as hexagonal in cross section and having six such slots providing for receiving a corresponding number of rods.

The turret bar 200 has end shafts 205 (Fig. 11) which are received within end housing members 206 and 207, at opposite sides of the machine. Suitable antifriction bearings 208 and 209 provide for rotatably mounting the entire assembly on the projecting end of a shaft 210 at the left hand side of the machine and an adjustable pin 211 slidably mounted in bracket 122 at the right hand side. Pin 211 has a recess 213 for receiving a compression spring 214. A removable plug 215 is threaded in place at the open end of the recess and may be tightened to apply yielding pressure to pin 211 through spring 214.

At the left hand side of the machine the shaft 210 is rotatably journaled in antifriction bearings 220 which are suitably mounted in the bracket 122. Shaft 210 overhangs the bearing 220 and at its outer end carries a suitable drive coupling which has driving engagement through reduction gearing with the shaft of a motor 224 suitably mounted on the side of bracket 122, this motor providing for the turning of the turret head under either manual or automatic control as desired at relatively slow speed, for example at the rate of about two revolutions per second.

It is necessary to provide for the driving of the turret head through a variable and predetermined angular movement, varying from a fractional part of a revolution up to approximately a full revolution, the shortest extent of the movement being one-sixth of a turn to provide for bringing the next succeeding stop into operative position. Where, however, less than the full number of rods are utilized, it is necessary to provide for any selected portion of the revolution, and thus a drive means capable of producing this selected fractional rotation of the turret head is provided.

Referring to Figs. 15 through 19, a cam disk 230 is keyed on shaft 210 by means of key 231, and is located between bearing 220 and turret housing 206. On the circumference of this disk is a raised cam 232 which is adapted to engage the face of lever arm 234 which is rotatably mounted on a stub shaft 235 which in turn is secured on the bracket 122. A spiral spring 236 tends to bias the shaft in the direction to maintain lever 234 against the surface of the cam disk 230, providing however for the raising thereof when cam 232 passes under the end of arm 234. The lower face of arm 234 is beveled as shown at 237 to cause the upward camming of the arm when engaged by the cam 232.

The arm 234 is formed with an integral upright stop face 240, laterally offset from the lower cam engaging face 237, such stop face 240 being directly opposed and substantially normal to a series of pins 242 which are removably received in the housing 206 of the turret head and are circumferentially spaced in positions corresponding to the number and spacing of the control rods. The housing is suitably tapped to receive the threaded portions of such pins, which are thus removable and replaceable by the operator to determine the stopping of the turret head with any selected control bar in the control position.

Arm 234 is suitably slotted as shown at 243 in Fig. 16, and a locking finger 244 is pivotally supported therein on pin 245, a leaf spring 246 engaging the finger to normally bias it into its locking position against a fixed pin 247 carried in the arm 234 and extending across the slot. However when one of the stop pins 242 moves toward the curved end of the finger 244, it engages the outer end thereof, lifting it upwardly on its pivot 245 against the action of the spring 246, the pin 242 continuing into a definite stopped position against the face 240 of the arm. In this position locking finger 244 snaps down into the position shown in Fig. 17, engaging over the stop pin 242, and preventing any possible reverse travel of the turret head.

As shown in Fig. 11, a friction disk 248 is provided between the cam disk 230 and the housing 206 of the turret head so that upon the rotation of the cam disk under the positive drive of motor 224, there is a tendency to rotate the turret head through the friction drive 248 which however allows slippage when the turret head is positively stopped by nose 240. Adjustment of friction drive is effected by turning screw 215 to apply more or less axial pressure to the turret head and thus to vary the amount of the frictional drag.

The sequence of operations is as shown in Figs. 17, 18 and 19. The parts are shown in the normal position in Fig. 17 with the turret head located in a fixed position and held with one of the stops 242 against the stop face 240 and under the finger 244. In response to rotation of the bar turn motor, shaft 210 is rotated to cause the driving of the cam disk 230 in a counterclockwise direction as shown by the arrow. This brings cam finger 232 against the lower side of lever arm 234, raising that lever against the action of spring 236 and simultaneously raising the stop face 240 to the clearance position as shown in Fig. 18. This allows the pin 242 to clear the stop face 240, and the friction drive 248 then causes the turret head to rotate along with the cam disk 230. However as soon as cam finger 232 passes beyond the lever 234, it is returned to blocking position, and the next stop pin 242 will snap under finger 244 and against the end of lever 240 to cause the stoppage of the turret head. As shown in Fig. 19 this occurs after only one-sixth of a revolution of the turret head, although in the next succeeding cycle of operation, as will be clearly understood, the rotation of the turret head would continue for five-sixths of a revolution.

While the bar turn motor may be placed in operation either under manual control or in response to the automatic operation, it is important to provide for completion of a cycle of rotation, in order to assure that a complete turn may be effected if desired. For this purpose a peripheral cam 250 of an arcuate extent corresponding to approximately 90° is provided at one side of cam disk 230 and is arranged to contact a roller 251 which actuates a switch arm 252 for control of a switch 253 (Figs. 12 and 37). The switch 253 is normally closed when not engaged by cam 250 and thus continues the circuit to the bar turn motor 224 even though its manual control is immediately released. This causes the disk 230 to continue to revolve from the position shown in Fig. 17 to that shown in Fig. 19, at which time the cam 250 is about to engage roller 251, to open the circuit to the bar turn motor. This de-energizes the motor which continues to coast for a limited distance, returning the parts to the approximate position shown in Fig. 17, the cam disk meanwhile having completed one cycle of revolution. As will be understood the turret head has been turned the fractional part of a revolution determined by the setting of the stop pins 242 thereon.

The several stop rods 195 are securely mounted in the turret head but may be readily removed therefrom when it is desired to replace one rod or one set of rods with another set. For this purpose the right hand turret housing 207 is provided with a series of beveled pins 260 corresponding in number and position to the slots for the several stop bars. Each pin 260 is spring pressed toward the rod by means of spring 261, the beveled end of the pin mating with a corresponding bevel on the end of the rod 195 when the latter is in position on the turret head and pressing against the pin.

At the left hand end of the turret head, housing 206 is provided with a similar series of pins 264 the ends of which are similarly beveled to mate with the beveled ends of the rods. Both pins 260 and pins 264 carry guide pins 265 projecting radially therefrom and riding in slots formed in the turret head housings to prevent the twisting of the pins. Pins 264 are threaded at their outer ends and are threadedly engaged with adjusting nuts 266 which project through a continuously open slot in the housing so that they are accessible for adjustment by the operator.

As shown in Fig. 11, there are corresponding index marks 268 on the rods and on a fixed portion of the turret assembly by means of which the operator in assembling the bars can through proper turning of the adjusting screws 266, move the individual rods 195 against the springs 261 as required to establish the proper and accurate longitudinal spacing thereof. This construction provides for a high degree of accuracy in the assembly of the rods, a quarter turn of the adjusting screws 266, for example providing for the longitudinal travel of the rod associated therewith of about .010 inch. Preferably the index mark 268 occupies a position on the turret head corresponding to the actual cutting edge of the knife, and it is thus possible to measure from that mark to positions on the bar, affording a corresponding measurement of the position of the back gage rearwardly of the knife, and hence the proper depth of the cut thereof.

The stops which are positioned upon the stop rods 195 are suitably clamped thereon in proper positions to establish predetermined movements of the back gage, in accordance with their location on the stop rods. Such stop members comprise a standard stop which with additional elements may be assembled to provide additional functions.

The standard stop is shown at 270 in Fig. 20 and comprises a body having a groove 271 cut on the lower side thereof to enable the stop to be received over the flange 198 of the rod. A clip 272 is secured to the front of the stop by means of bolts 273, the clip extending downwardly to be engaged over the opposite side of the flange 195. It will thus be evident that upon loosening of bolt 273 and clip 272 each individual stop may be removed and replaced upon the rod, without in any way interfering with the assembly or requiring the removal and repositioning of other stops thereon.

The working face of the standard stop is shown at 275; it has a beveled lead-in face 276 and is cut off at the trailing end as shown at 277 forming a sharp edge which affords an accurate and sharply defined operation when feeler arm 154 rides thereover. As shown the beveled face 276 is approximately at a 45° angle corresponding to the angular inclination of feeler arm 154.

In order to provide for the operation of the machine in the making of what is known as a trim-out, it is desirable to provide that the machine moves forwardly at slow speed over the relatively short space involved in the making of such trim-out. This is necessary because if the machine were placed in high speed operation, it would travel so far before it could be stopped that the usual narrow trim-out would not be possible, and thus substantial waste or detailed manual manipulation would be required. In accordance with the present invention, provision is made for effecting a trim-out through the use of an auxiliary or trim-out attachment stop which is assembled on the front face of the standard stop.

This is shown in Figs. 21 and 23 where the trim-out stop 280 is mounted on the body of the standard stop by means of a clip 281 held in place by bolt 282. The trim-out stop has a dovetail base 283 so that when clamped by clip 281 upon the top of the standard stop it will maintain a uniform and accurate position, immediately in the front of the standard stop. The feeler arm engaging portion is shown at 285 and as indicated in Fig. 23, the extent by which this stop overlaps the standard stop, is the dimension of forward feed provided for making the trim-out. It has a sharply defined edge 286 for accurately controlling the movement of the feeler arm. As an example, the present invention provides for making a trim-out with the back gage operating at slow speed over a range varying from about one thirty-second inch up to the overlapped length of the trim-out stop, which may conveniently be ⅜ to ½ inch. As will be understood, for movements which are greater than this, the machine is arranged to operate at fast speed.

Another type of stop is that provided at the ends of the rods. This is an auxiliary stop, is either a thick or a thin stop, and is assembled directly upon the standard stop. At the forward limit, these auxiliary stops provide for reversing the travel of the back gage, with or without the rotation of the turret head. At the rearward limit, the auxiliary stops provide for stopping the travel of the back gage, with or without reversing its travel to cause it to travel forwardly. As shown in Figs. 24 and 25, the auxiliary stops are mounted upon the rear face of the standard stop.

The thin stop is shown at 290, and the thick stop is of about double thickness and indicated by dotted lines 292. As indicated, both side surfaces of stops 290 and 292 are beveled as shown at 294 providing for engagement with one or the other of the feeler arms 158, 162, in either direction of operation. These stops are not determinative of the position of the back gage when making cuts and thus the beveled faces are not undesirable.

In order to prevent accidental travel of the back gage beyond safe limits in either direction, forward safety stop 296 is provided which is suitably mounted upon bracket 122 and extends in position where it will be contacted by the forward feeler arm 158 when the control carriage, and the back gage, have reached a safe forward limit of travel. Similarly a rear stop 297 is mounted on the opposite bracket 122 in position to be engaged by the rear feeler arm 162 when the carriage, and back gage, have reached safe limits of rearward travel.

Referring now to Figs. 27 and 27A, there is shown diagrammatically the functioning of the central feeler arm 154 as the feeler arm engages one of the standard stops 270. Movement of the feeler arm and of the control carriage is presumed to take place from right to left, corresponding to forward travel of the back gage. Further the back gage is considered to be moving forward at fast or high speed prior to the time that feeler arm 154 engages the stop 270.

As the feeler arm engages the beveled surface of the stop, it is cammed toward the rear of the machine into the dotted line position shown opposite stop 270 in Fig. 27. In so moving, feeler arm 154 effects the operation of both switches 152 and 153 from their normal position to their opposite or actuated positions. This results in the slowing down of the drive motor under control of the speed control valve 70, as indicated by the diagram of Fig. 27A, deceleration taking place at a substantially uniform rate while the back gage continues to travel forwardly. Shortly before the feeler arm 154 reaches the end of the stop 270, deceleration has been completed within a definite amount of travel and the back gage continues to move forward a short distance under slow speed conditions. The stop is only long enough to assure such controlled deceleration with the additional portion causing continued movement at slow speed being as limited as possible so that the stopping of the back gage is accomplished as quickly as possible and with a minimum and constant length of travel. A suitable length for the working face of the standard stop is found to be three-quarters of an inch, requiring about one-fifth second from the time it is first contacted until the back gage is stopped.

As soon as the feeler arm 154 rides off the end of cam 270, it returns the full way to its original position indicated by the dotted line position at the left side of the stop 270 in Fig. 27. This operation results in releasing both switches 152 and 153, allowing them both to return to their original positions. This causes the stopping of the back gage, and because the back gage has been moving at slow speed, the actual stop is made with only a very limited overtravel of approximately .005 inch and since this takes place uniformly for all stops, it can be determined quite accurately with respect to the actual cutting of the work. Further the initial position of feeler arm 154 can be determined, through the adjustment of bolt 188, so that it will compensate for this overtravel, actually causing the actuation of the switches 152 and 153 slightly in advance of the final position of the stops, so that when the carriage and back gage finally stop, they will be in the precise locations determined by the setting of the stops. When the stop is to be set in a definite position corresponding to a stationary position of the back gage, it is only necessary to manually deflect the feeler arm 154 to one side until bracket 178 engages against the head of bolt 188, and to locate the stop at the end of the arm when so deflected. Then upon release of the arm, the proper amount of lead will be introduced to actuate the control sufficiently in advance of the final desired position so that when the gage finally comes to rest, it will be in the precise location desired.

Fig. 28 illustrates the condition which takes place during the return movement of the back gage and of the feeler arm 154, indicating that during return the feeler arm swings on its universal support to the forward side of the stop, as shown in dotted lines, and thereby passes the stop without however producing any effect upon the controlling of the operation.

Figs. 29 and 29A illustrate diagrammatically the conditions which occur when a trim-out stop is used. As there shown the trim-out stop 280 is assembled upon the front face of the standard stop 270, and is set to overlap the latter by an amount to provide the desired length of trim-out.

On operation, with the carriage and feeler arm 154 engaging the standard portion of the stop in the forward direction of travel and at fast speed, deceleration of the back gage takes place in the same manner as described in connection with Figs. 27 and 27A. When the feeler arm leaves the edge of the stop 270 it is not permitted to return the full way to its original position but is stopped at an intermediate location by reason of the trim-out stop 280. This results in the return to normal of only switch 153, leaving switch 152 actuated. The control circuits so established provide for stopping the operation of the motor in the same manner and with the same accuracy as described above. When stopped the first cut may be made, but after the completion of that cut, instead of the back gage starting in fast speed, it starts in slow speed and remains in slow speed as long as the feeler arm 154 bears against trim-out stop 280. As soon as the feeler arm drops off the end of the trim-out stop 280, it returns to its original position, thus releasing the remaining switch 152. Through the provision of proper circuit controls this operation also effects the stopping of the back gage motor after only the short travel corresponding to the overlap between stop 270 and the trim-out stop 280, and the trim-out cut may then be effected. However upon completion of that cut, the back gage motor will then start in fast operation, and continue until the next stop is encountered.

Referring now to the stops at the ends of the bar which are engaged by forward feeler arm 158 and rear feeler arm 162, respectively, Fig. 30 shows diagrammatically the cooperative relationship established between such feeler arms and an end stop comprising a standard stop 270 with a thin stop 290 secured to the rear face thereof. Both feeler arms are shown diagrammatically as cooperating with a single such stop although it will be understood that in operation the forward feeler arm 158 cooperates with one stop at the forward limit of travel while feeler arm 162 cooperates with another stop at the rear limit of travel. These feeler arms are preferably beveled on both faces as shown.

As feeler arm 158 rides upon the bevel face 294 of the thin stop 290 only switch 156 is actuated, and this causs reversal of the directional valve 54, causing the back gage motor to operate in reverse to move the back gage rearwardly.

When the rear feeler arm 162 rides upon the thin stop 290, only switch 160 is actuated, resulting in the stopping of the operation of the back gage motor.

Fig. 31 is a view similar to Fig. 30 showing the controls which are effected in response to the engagement of the feeler arms 158 and 162 respectively, with a thick stop 292. When forward feeler arm 158 rides upon the thick stop, it causes the actuation of both switches 156 and 157. Switch 156 effects the reversal of the back gage motor as previously described while the actuation of switch 157 results in the operation of the bar or turret turn motor 224, to cause a cycle of operation of that motor as above described.

When rear feeler arm 162 engages the thick stop 292, it causes the actuation of both switches 160 and 161. Actuation of switch 160 causes the back gage motor to stop as previously described. Actuation of switch 161 causes the reversal of the directional valve 54 and causes the back gage motor to begin operation in the forward direction.

As shown in Fig. 3, the various electrical connections from the control carriage are carried in a flexible cable 298 which projects upwardly from a connection 299 carried on bracket 127 at the rear of the work table.

In order to illustrate an operation which can be effected by the present control, a number of diagrams showing typical cutting operations are represented in Figs. 32 to 36 inclusive. As shown in Fig. 32, a pile of paper sheets 300 is represented, having the four sides marked A, B, C, and D respectively, with side A presented forwardly toward the knife and with side C in contact with the back gage 40. In a typical setup for handling of material of this type, the first stop bar 195 would have a standard stop 270 thereon at the position corresponding to the first line of cut 301, adjacent the side A of the sheet of material. With the back gage in a rearward position, the sheet material would be placed on the table and moved back against the gage, so that when placed in operation the first movement of the back gage would bring it forwardly until this first stop was engaged, thereby stopping the back gage in position to make cut 301.

Following this cut the back gage would immediately be placed in operation for the second stop, and would advance to the second stop on the same bar. The operator would manually turn the pile to bring face D against the back gage leaving face B exposed beneath the knife and in position so that line 302 will be at the knife line where the next cut is made, the newly cut side A being in contact with the side gage 303.

After completing the second cut at the line 302, the back gage will at once travel forwardly to a forward limit stop which embodies a thick stop 292. This results in the reversal of the back gage motor and the concurrent operation of the bar turn motor 224. This causes the back gage to return toward its rear position with the bar turn motor rotating the turret head to bring the second bar into control position. As the back gage reaches a predetermined rearward location feeler arm 162 engages another thick stop 292 resulting in first stopping the rearward movement of the back gage, and then restoring it to its forward direction of travel.

Meanwhile the operator has again turned the pile this time moving face A toward the back gage and with freshly cut face B against the side gage 303, face C extending outwardly toward the knife. Forward travel of the back gage continues until it engages a standard stop on the second control bar, thereby stopping the pile in proper position for making the cut 305 on face C.

Following the making of cut 305, the back gage resumes forward travel to a second standard stop on the second bar, while the operator turns the pile to bring face D toward the knife. In this position cut 306 is made and without manually moving the pile the back gage then advances to a third standard stop of the second bar at which cut 307 is made.

Following the making of this cut the back gage advances toward the front of the machine, delivering the work to the operator until a forward thick stop 292 is encountered which effects reversal of the back gage motor and concurrent operation of the bar turn motor to bring the third bar into control position. The back gage then returns toward a predetermined rear position where it engages another thick stop to cause first the stopping and then the restoring of the back gage to its forward travel.

Meanwhile the operator has turned the work, now comprising two sections, into the position shown in Fig. 36, and the back gage then moves up to a predetermined position as determined by a stop on the third bar which is a trim-out stop. In this position cut 308 is made, and immediately following that cut, the back gage moves forwardly in slow speed to the position indicated by cut line 309 whereupon the machine is actuated to make the trim-out cut. Thereafter the back gage can be arranged to move forward to a predetermined position as controlled by a thick stop, to deliver the work to the operator, to turn the turret head to bring the first bar back into place for a subsequent cycle of operation, and then to return to a rearward position. In such rearward position a thin stop is located so that the back gage merely stops, but does not resume its forward travel until the operator is ready to start the next cycle of operation. If a thick stop is used in place of the thin stop, the back gage will reverse and start forward to a first stop on the original bar in preparation for a second sequence of operations.

The above description is merely typical or representative of a simple pattern involving the use of three separate bars with control over forward and backward movements of the back gage throughout a complete cycle of fast and slow movements of any desired extent to follow a predetermined pattern of cuts. It will be understood that either a greater or lesser number of steps of movement and of stop bars may be utilized as desired for the particular work to be handled.

It will also be evident that where a series of closely spaced cuts are desired, similar to a group of trim-outs, special stops may be arranged to retain the feeler arm 154 in its intermediate position and thus to provide for such succession of slow forward movements of the back gage.

It will also be evident that since the positions of the stops of the control bars are in exact correlation with the movements of the back gage, it is not necessary that the setup for any particular sequence of operations be made on the machine. Thus the machine can be operated with one set of bars while a new setup is made on another set, entirely apart from the actual machine. Further, the position of the stops may be determined by an auxiliary scale, with the precise location of the stops being determined in relation to the index mark 268 and with the spacing of the stops being determined by direct measurement.

Another feature of advantage is the fact that the rods 195 may be placed directly in contact with the work, and the several stops positioned thereon by direct reference to the work itself, thus eliminating the need for any scale or measurement. Such a setting is indicated in Fig. 22 where a sheet of work material is indicated at 315. The flat face 316 (Fig. 20) of the control rod 195 is placed in contact with the work with index mark 268 in line with the left hand edge of the sheet. Assuming that a cut is desired along line 317, the left hand edge of the stop 270, which also has a flat rear face flush with face 316, is directly aligned with such line 317. Thereafter, upon insertion of the bar into the turret head, and the axial adjustment thereof to set the index mark 268 as described, and with the right hand edge of the work against the back gage, the stop will provide for stopping the back gage accurately in position to make a cut on line 317. Because the stops and the stop bar assemblies are relatively light weight and inexpensive, it is highly advantageous to maintain a group of stops assembled on the rods for each particular type of work.

Referring now to the circuit diagram Fig. 37 the necessary electric and interrelated hydraulic circuits are shown in diagrammatic form. The positive side of the control line is indicated at 320 and the negative at 322. The manual stop button is shown at 33 and the manual control 27 for switching from manual to automatic operation is shown as comprising two switch arms 325, 326 in the form of a double-pole double-throw switch. When these switches are set for automatic operation they occupy their full line positions, and when the control 27 is set for manual operation they occupy their dotted line positions.

The forward speed control button 30 is shown as comprising a circuit closer 330 which first closes a slow circuit when pushed part way in, and as having normally closed back contacts 331 which open when the push button is actuated. When the button is pressed all the way in, contact arms 331 close a fast control circuit.

The pressure switch 110 is adapted to close when the pump 56 is developing pressure, and in so doing closes a circuit which may be traced from the positive side of the line to stop button 33, line 332 closed switch contacts 110, to the operating coil of a relay 333, the opposite side of which is connected to the negative side of the line. Upon being energized relay 333 closes all of its contacts 333A, 333B, 333C, and 333D.

Assuming the switch 27 to be set for manual operation, and with the push button 30 being pressed part way in to establish slow forward travel, the following circuits may be traced. From the positive side of the line, through stop switch 33, line 334, contacts 156 of the forward limit switch, the closed back contacts 335B of the reversing relay 335, through the contact maker 330, line 336, through the operating coil of a relay 337 and to the negative side of the power line. Upon the making of this circuit, relay 337 is energized, opening its back contacts 337B and closing its contacts 337A. The closing of contacts 337A establishes an energizing circuit for the operating coil of relay 340, connecting from the positive side of the line, through line 336, to relay 340 the opposite side of which is connected directly to the negative side of the line. This results in the energization of relay 340 which closes each of its contacts 340A, 340B and 340C. A circuit may then be traced from the positive side of the line to line 336, through closed contacts 337A, closed contacts 340C, the closed contacts of switch 153, line 341, closed contacts 340A to the common line 342 from which a branch connection is made to relay 343, the opposite side of which is connected directly to the negative side of the line. Upon being energized relay 343 closes its contacts 343A thus connecting directly from the positive line through line 344 to pilot valve solenoid 345, the opposite side of which is connected to the negative side of the line. This solenoid 345 becomes energized and actuates pilot valve 61 to adjust the pressure regulating valve 60 to the full or high pressure condition for operating the back gage motor.

The other circuit from line 342 continues through contacts 333A and 333B, and through line 346 to the forward solenoid 64 and from that to the negative side of the line. This causes the actuation of the directional valve 54 to Forward position, and the back gage motor is then placed in operation at slow forward speed. This operation will continue as long as the push button 30 is held but will stop when the push button is released, or in the event that forward feeler arm 158 should engage and actuate forward limit switch 156 to its alternate position.

In the event that the push button 30 is pressed all the way in, an additional circuit is closed which may be traced from the slow contacts 330, which remain closed, through circuit closer 347 in contact with the Fast switch contacts 347, through line 90A, and directly to the fast solenoid 90 the opposite side of which is connected to the negative side of the line. This solenoid upon being energized, draws in its armature and shifts the speed control valve 70 to the fast position in the manner already described. A parallel circuit energizes fast relay 348 but its actuation is ineffective with the control in manual position. Should the push button 30 be partially released the fast solenoid 90 will be de-energized and the motor would then decelerate at the controlled rate as described and continue to operate in slow forward speed until the push button was entirely released.

In order to actuate the back gage in the reverse direction under manual control, the "Reverse" push button 32 is manually pressed. This establishes a circuit from the positive line through manual stop 33, line 334, line 349, through the normally closed reverse limit switch 160, through push button 32, and through line 350 directly to the reverse solenoid 65, the opposite side of which is directly connected to the negative side of the line. A parallel circuit is established to energize reversing relay 351 which upon closing establishes a circuit directly from the positive side of the line through line 344 to the pilot valve solenoid 345, thereby establishing full operating pressure in the system as already described. The back gage is thus placed in operation for reverse travel at full speed.

Whereas it is desirable to provide for forward operation of the back gage only as long as the manual push button is depressed, it is preferred to provide for continuing reverse operation of the back gage until it reaches the rear limit of its travel. For this purpose the holding relay 335 is provided which is energized directly from line 350, and which upon closing of the push button 32, closes its contacts 335A to bypass the push button and thus retain the circuit conditions as described. The back gage thus continues its rearward travel even though the push button is released. When the feeler arm 162 engages the rear limit stop, switch 160 is actuated and the circuits above described are de-energized, causing the stopping of the back gage motor.

Manual operation of the bar turn motor 224 may be effected by the actuation of push button 35 also carried on the control panel 25. When so actuated manually, a circuit is established from the positive side of the line, through line 334, push button 35, line 352 to the back contacts 354B of a relay 354 which is normally de-energized during manual operation, the circuit continuing through line 355 directly to the bar turn motor 224 one side of which is connected directly to the negative side of the line. A parallel circuit is closed through back contacts 253 to actuate a holding relay 356. Upon actuation, relay 356 closes its contacts 356A to establish a circuit for the energization of the bar turn motor through line 357, thus bypassing push button 35. The bar turn motor thus continues in operation until the cam 250 substantially completes a cycle of rotation at which time it raises cam switch 252, breaking the holding circuit and thus de-energizing and allowing the bar turn motor to stop. In this way separate, complete cycles of operation of the bar turn motor are accomplished.

Referring now to the conditions for automatic operation of the machine as a spacer, switch 27 on the control panel is thrown to the automatic position in which switches 325 and 326 occupy their full line positions as shown in Fig. 37. The closing of switch 325 establishes a circuit from the positive side of the line through stop button 23, line 334, forward limit switch 156, back contacts 335B of reversing relay 335, through line 359, switch 325, lines 360 and 369, control switch 152, and line 361 to the operating coil of the relay 354, the opposite side of which is directly connected to the negative side of the line. Relay 354 is thereupon energized, closing its contacts 354A and opening its contacts 354B. The closing of contacts 354A establishes a circuit from the positive line 360 through contacts 354A, line 341, control switch 153, and line 362 to the automatic start switch indicated at 364. This switch is actuated by a cam 365 carried on shaft 366 which is correlated with and preferably an integral part of the operating mechanism for the knife and clamp such as the main drive shaft, a revolution of which causes the reciprocating stroke of the knife. As described in said copending application, such switch may be conveniently mounted for actuation in relation to the movement of the knife, the cam 365 being arranged to close switch contacts 364 as the knife is returning to its normal position following a cutting stroke.

Upon the closing of contacts 364, the circuit is continued through line 368 to the operating coil of relay 340, the opposite side of which is connected to the negative side of the line. Upon the closing of relay 340, its contacts 340A are closed thus continuing the circuit from the positive line through line 360, closed contacts 354A, 340A, line 342 to relay 343 which upon actuation closes its contacts 343A to thus energize the pilot valve solenoid 345, thereby establishing full operating pressure in the system. Meanwhile pressure switch 110 has closed its contacts and relay 333 is thus energized; thus a parallel circuit from line 342 is established through contacts 333A, 333B, and line 346 directly to the forward solenoid 64. The back gage motor is thus placed in operation in the forward direction.

The closing of relay contacts 340C bypasses the automatic switch contacts 364 and provides for maintaining the circuit for the energization of relay 340, that circuit being maintained however through the control switch 153 as previously described.

The closing of relay contacts 340B completes a circuit from the positive side of the line through line 360, line 369, control switch 152, line 361, switch contacts 340B, line 370, back contacts 331, back contacts 337B and through lead 348 to the fast control solenoid 349. A parallel circuit is also established directly to the fast solenoid 90 to effect actuation thereof. Upon the closing of relay 348, its contacts 348A establish a bypass around the contacts 337B through switch 326 and thus the circuit is maintained with the back gage motor operable for forward travel and at fast speed.

Assume now that the central arm 154 of the control carriage in moving from right to left across the face of the machine engages one of the standard stops 270. In doing so both switches 152 and 153 are actuated against their biasing means to their alternate positions. The opening of switch 152 immediately opens the energizing circuit for relays 340, 354, 348, and the fast solenoid 90, causing the back gage motor to decelerate at a controlled rate in the manner described above, and to thereafter continue in forward operation at slow speed.

While it is desirable to establish the closing circuits for the actuation of forward solenoid 64 through a relay, it is undesirable to break that circuit through the relay because of the delay involved in so doing, and the possibility of variations in the time required which would result in appreciable variations in the amount of over-running of the back gage motor following the actuation of the control switch. For this reason it is desired to effect a transfer of the circuit after it has been established through the relay, so that in preparation for the stopping of the back gage, the circuit will be controlled directly by the switch in the control carriage 120 and thus provide a rapid and substantially uniform time of opening of the circuit, thereby maintaining a limited and substantially uniform overrun of the back gage motor which can be properly compensated for as above described to secure accuracy and uniformity in the final stopped position of the back gage.

This is effected by the initial actuation of the two switches 152 and 153 when feeler arm 154 engages a standard stop. Upon being actuated, a new control circuit is established which may be traced from the positive side of the line to line 360 and 369, switch 152 in its raised position, switch 153, through line 374, switch contacts 333B, and line 346 direct to forward solenoid 64. Relay 343 and through it pilot valve solenoid 345 continue to hold in by parallel energization through contacts 333A. The operation of switches 152 and 153 takes place quickly, these switches being of the quick make and break type, and the relays mentioned above continue to hold in during the very brief interval required to transfer the circuit in the manner described.

When feeler arm 154 passes the end of the standard stop, it returns the entire way to its original position, thereby returning both switches 152 and 153 to their original positions as shown in the diagram. This operation breaks the circuit to forward solenoid 64 as well as pressure control solenoid 343 directly at the switches 152 and 153, and further operation of the back gage motor is therefore promptly terminated, pressure likewise being reduced in the system. From the above it will be evident that the system under these conditions is the same as it was originally, and thus relay 354 will also be re-energized and the controls will be ready to reinstitute forward motion of the back gage at fast speed in response to the closing of the automatic start switch 364 following the next cutting operation.

When however the feeler arm 154 engages a trim-out stop, it is desired to provide for the starting up of the back gage motor following the first cut, at slow speed rather than at fast speed. The initial operation when the feeler arm first engages the standard portion of the trim-out stop is the same as described above. When however it rides off the end of the standard stop, it engages the trim-out stop as indicated in Fig. 29, and returns only to its intermediate position, resulting in the return of switch 153 to its original position while retaining switch 152 in its actuated position. Opening of switch 153 breaks the circuit for the forward solenoid in the same manner as described above, and the back gage motor will thus stop accurately in the position determined by the standard stop, so that the first cutting operation may be made.

However when this operation is completed, the circuit established by the closing of the automatic start switch 364 may be traced from lines 360 to 369, raised switch 152, through the normal position of switch 153, line 362, automatic start switch contacts 364, line 368, to the energizing coil of relay 340 which thereupon closes its contacts. The closing of relay contacts 340C establishes a bypass circuit around the automatic start switch in the manner already described. The circuit may also be traced from lines 360 and 369, raised switch 152 to line 341, through contacts 340A and line 342 to the pressure control solenoid 343 which effects the closing of pilot valve solenoid 345 in the manner described above. Similarly a parallel circuit continues through switch contacts 333A and 333B and line 346 to the forward solenoid 64. It will be noted however that there is no circuit through switch contacts 340B and thus the fast relay 349 and the solenoid 90 remain de-energized. The system then operates in the forward direction and at slow speed, to make the trim-out as indicated in Figs. 29 and 29A.

When the feeler arm 154 rides off the end of the trim-out stop 280, switch 152 returns to normal position, thus breaking the circuit to the forward solenoid directly, and resulting in the accurate stopping of the back gage motor in the desired location. It will also be evident that the parts are now restored to their original position so that upon the subsequent actuation of the knife, the system will again provide for the forward travel of the back gage at its fast speed.

Referring now to the operation of the forward limit switch, and assuming that forward feeler arm 158 engages a standard stop having a thin stop 290 on its rear face, such engagement causes the actuation of only switch 156, leaving switch 157 in its original position. The actuation of switch 156 establishes a circuit from the positive side of the line through line 334, switch arm 156 and line 376, switch contacts 333C to line 350 from which an energizing circuit is established for relay 351 which upon actuation closes its contacts 351A to complete a circuit for energizing pilot valve solenoid 345 to thus establish proper operating pressure in the system. A parallel circuit leads directly to the reverse solenoid 65 of the directional valve 54 which thus establishes the condition for reverse operation of the back gage motor and the back gage thus moves rearwardly at full speed.

Another parallel circuit is established for energizing relay 335, causing the closing of its contacts 335A, to establish a holding circuit through the rear limit switch 160. It will be understood that as the carriage reverses its travel, switch 156 will return to its normal position, but the previously established circuits continue through this rear limit switch 160, causing the back gage to continue in its rearward travel until the rear feeler arm 162 engages a stop at the rear, causing the opening of switch 160, to thus stop the rearward operation of the carriage at the position determined by the rear limit stop. Assuming that this rear stop is also composed of a standard stop with a thin stop 290 on the rear thereof, the back gage does not reverse and resume forward travel, but is merely stopped at the rear limit of its travel.

However if a thick stop 292 is provided to be engaged by feeler arm 162 at the rear limit of its travel, both switches 160 and 161 will be actuated. This deenergizes the circuit previously described and thus the reverse solenoid drops out and the motor stops in the manner already described. In addition a circuit is established from the positive side of the line through lines 334 and 349, actuated switch arms 160 and 161, line 382, switch contacts 333D and line 383 to the relay 340 which is thereupon energized. The closing of relay 340 sets up a parallel circuit from the line 383 through contacts 340C to switch 153 in normal position, line 341, switch contacts 340A, line 342 to relay 343 and pilot valve solenoid 345, a parallel circuit being likewise established to switch contacts 333A and 333B to effect energization of the forward solenoid 64. A circuit also exists for energizing relay 354 and through switch contacts 340B for the energizing of the fast relay 349 and fast solenoid 90, such energizing circuit taking place through switch arm 152 in the same path as originally described. Thus when a thick stop is used at the rearward limit of travel of the back gage, the back gage first stops, then reverses and moves forwardly at high speed, independently of the operation of the automatic switch 364, and continues in such travel until the feeler arm 154 engages a stop in the manner already described.

In the event that a thick stop is used at the forward limit, upon engagement by feeler arm 158 not only is switch 156 actuated in the same manner as described above, but in addition switch 157 is actuated. This latter actuation results in establishing a circuit from the positive side of the line, through actuated switches 156 and 157, lines 385 and 386, to the back contacts 354B of relay 354, through line 355 directly to the bar turn motor 224. The bar turn motor thus starts to operate and its holding circuit is established through relay 356 in the same manner as described above so that a complete cycle of rotation of the turret head is accomplished during the time that the back gage is moving rearwardly. It will be noted that accidental actuation of the switch 157 during the time the back gage is moving forward will have no effect upon the bar turn motor because the circuit above described is completed through the back contacts of relay 354.

It will thus be apparent that a completely automatic and selective system of control is established for the operation of the back gage, which may be caused to move forward at high speed where an extensive travel is desired, or which may be allowed to move forward only at slow speed where a short travel or trim-out is desired. In either case the stopping of the back gage is highly accurate and in close conformity with the actual positions of the stops on the stop bars, and deceleration from fast to slow speed takes place under continuous control to secure the maximum rate of deceleration consistent with maintaining the pile against the gage.

Further, by selection of thick and thin stops at the forward limit of travel, the back gage may be readily caused to merely return to a rearward location without changing the setting of the turret head, so as to repeat its pattern of movements using the same set of stops on a single bar. Alternatively it may be caused to actuate the bar turn motor, to rotate the turret head, and thus to bring the next successive bar into operative relation as desired to carry out a predetermined pattern of work.

Similarly, by selection of the thick or thin stops in the rear limit of travel the back gage may be caused to either stop, if at the end of a complete cycle of operations, or may be caused to stop and reverse, thus automatically continuing the cycle with either the same set of bar stops or with the next successive set.

The invention thus provides a machine which is highly flexible, and readily adapted to the handling of any kind of work, which can be quickly and accurately set up, and in which adjustment for changing from the handling of one type of work to another can be accomplished with a minimum of effort and time on the part of the operator.

The term "back gage" is used herein as that is the term commonly employed in the art in connection with machines of the type shown herein but it is to be understood as not limited to the particular position of the work-moving gage relative to the knife, and is intended to apply not only when the gage is in back of the knife but also when the gage is located in front or at the side of the knife. Similarly, the terms "feeler" or "feeler arm" and "stops" are intended to apply to and embrace different forms of sensing elements which mutually cooperate to establish control of the movements and stopping of the back gage as described.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A mechanism of the character described for a machine having a work table and a work position thereon comprising a back gage, hydraulic motor means for moving said back gage over said work table on continuous forward and return strokes, a control bar, a plurality of stops on said bar of different characteristics, means for adjustably securing said stops in different positions on said bar corresponding to the locations where it is desired to stop the work, sensing means movable relative to said control bar in relation to the movement of said back gage including means controlled by certain of said stops for stopping said hydraulic motor with said back gage in predetermined positions relative to said work position, and additional means controlled by others of said stops for stopping the travel of said gage at any point in one direction and reversing said hydraulic motor to cause said back gage to reverse and travel in the opposite direction.

2. A mechanism of the character described for a machine having a work table and a work position thereon comprising a back gage, means for moving said back gage over said work table on forward and returned strokes, a control bar, a plurality of stops on said bar of different characteristics, sensing means movable relative to said control bar in relation to the movement of said back gage including means controlled by certain of said stops for stopping said back gage in predetermined positions relative to said work position, additional means controlled by others of said stops for stopping the travel of said gage in one direction and causing it to reverse and travel in the opposite direction, and means selectively controlled by still others of said stops for causing movement of a second control bar into operative relation with said sensing means to control a different cycle of movements of said back gage.

3. A sheet cutting mechanism of the character described comprising a work table having a work position thereon, a cutting knife reciprocable to cut the work material at said work position, a back gage, means for moving said back gage over said work table on forward and return strokes, means coordinated with the cutting operation of said knife to initiate movement of said moving means following the making of a cut, a control bar, a plurality of stops on said bar of different characteristics, sensing means movable relative to said control bar in relation to the movement of said back gage including means controlled by certain of said stops for stopping said back gage in predetermined positions relative to said work position, and additional means controlled by others of said stops for stopping the travel of said back gage from either direction of travel and causing it to reverse and travel in the opposite direction following a cutting operation.

4. A spacer mechanism of the character described comprising a work table, a back gage movable over said work table in forward and return directions of movement, power means for operating said back gage, and control means for said power operating means including means operable in continuous sequence for advancing said back gage forwardly to a first group of predetermined positions, means for returning said back gage to a predetermined rearward position, and means for thereafter advancing said back gage forwardly to a second group of predetermined positions selected independently of the first said group.

5. A spacer mechanism of the character described which comprises a work table, a back gage movable over said work table in forward and return directions of movement relative to a position where a work operation is performed, means for operating said back gage, control means for controlling the starting of said operating means in response to the completion of each work operation, means for causing the stopping of said back gage at a series of independently selected positions, means operable upon the arrival of said back gage at the foremost one of said series of positions for causing reversal of said operating means to cause the return movement of said back gage.

6. A spacer mechanism of the character described which comprises a work table, a back gage movable over said work table in forward and return directions of movement relative to a position where a work operation is performed, means for operating said back gage, control means for controlling the starting of said operating means in response to the completion of each work operation, means for causing the stopping of said back gage at a series of independently selected positions, means operable upon the arrival of said back gage at the foremost one of said series of positions for causing reversal of said operating means to cause the return movement of said back gage, and means for stopping said return movement at a predetermined position.

7. A spacer mechanism of the character described which comprises a work table, a back gage movable over said work table in forward and return directions of movement relative to a position where a work operation is performed, means for operating said back gage, control means for controlling the starting of said operating means following each work operation, means for causing the stopping of said back gage at a series of predetermined positions, means operable upon the arrival of said back gage at the foremost one of said series of positions for causing reversal of said operating means to cause the return movement of said back gage, and means for stopping said return movement at a predetermined position and for again reversing said operating means to cause the forward movement of said back gage and the stopping thereof in a selected position from said forward movement.

8. A mechanism for operating on material of the character described which comprises a work supporting table, a back gage movable forwardly and rearwardly relative to said table, a control bar having a plurality of adjustably positioned stops thereon, and means movable in correlated relation with the movement of said back gage and cooperating with said stops to control the movement of said gage automatically in either direction for a sequence of operations from any point on the table to any other point on the table within the limits of travel of the back gage.

9. A spacer mechanism of the character described which comprises a work supporting table, a back gage movable forwardly and rearwardly relative to said table, power operating means for moving said back gage, a control bar, means movable relative to said control bar in correlated relation to the travel of said back gage, stops selectively positioned on said control bar cooperating with said movable means for controlling the operation of said power operating means to stop the travel of said back gage accurately at a predetermined point, and an additional stop on said control bar cooperating with said movable means for reversing said power operating means to reverse the travel of said back gage.

10. A spacer mechanism of the character described which comprises a work supporting table, a back gage movable relative to said table, a motor for actuating said back gage, and control means for said motor including a control bar, means for removably positioning said control bar in operative position on said machine, sensing means movable relative to said control bar in direct relation to the movement of said gage for controlling the operation of said motor, a plurality of stops on said bar cooperating with said sensing means to control said motor and the travel of said back gage, and means for separately assembling each said stop on and removing it from said bar independently of the other stops thereon.

11. A spacer mechanism of the character described which comprises a work supporting table, a back gage movable relative to said table, a motor for actuating said back gage, and control means for said motor including a control bar, a plurality of stops adapted to be positioned on said bar in predetermined spacing thereon, means for separately assembling each said stop on and removing it from said bar independently of the other stops thereon, means for removably positioning said control bar in operative relation on said machine and providing for removal of said bar for assembly and positioning of said stops when so removed, and sensing means movable relative to said stops and actuated thereby for controlling the operation of said motor.

12. A spacer mechanism of the character described which comprises a work supporting table, a back gage movable relative to said table, a motor for actuating said back gage, and control means for said motor including a control bar, a plurality of stops adapted to be positioned on said bar in predetermined spacing thereon, means for separately assembling each said stop on and removing it from said bar independently of the other stops thereon, means for removably positioning said control bar in operative relation on said machine and providing for removal of said bar for assembly and positioning of said stops when so removed in direct relation to the work, and sensing means movable relative to said stops and actuated thereby for controlling the operation of said motor.

13. A mechanism for handling a pile of sheet material comprising a work receiving table, a back gage movable relative to said table against which said pile of sheet material is placed, power operated means for moving said gage on a work advancing stroke, and control means for said power operated means for stopping said movement under a predetermined controlled rate of deceleration to avoid travel of the work ahead of said back gage.

14. A mechanism for handling a pile of sheet material comprising a work receiving table, a back gage movable relative to said table against which said pile of sheet material is placed, power operated means for moving said gage on a work advancing stroke, and control means for said power operated means operable during said advancing movement including a high speed control and a slow speed control for said power operated means, means for transferring from said high speed to said slow speed control, and means for decelerating said back gage at a predetermined rate during said transfer to avoid travel of the work ahead of said gage.

15. A mechanism for handling a pile of sheet material comprising a work receiving table, a back gage movable relative to said table against which said pile of sheet material is placed, power operated means for moving said gage on a work advancing stroke, and control means for said power operated means operable during said advancing movement to stop said pile of sheet material quickly and accurately including a high speed control and a slow speed control for said power operated means, means for transferring from said high speed to said slow speed control, means for decelerating said back gage at a predetermined rate during said transfer to avoid travel of said material ahead of said gage, and means for stopping said back gage from its slow speed operation.

16. A spacer mechanism of the character described comprising a work receiving table against which a pile of sheet material is placed, a back gage movable relative to said table, power operated means for moving said gage on a forward advancing stroke and on a rearward return stroke, and control means for said power operated means operable during said forward movement to stop said material at a predetermined point including a high speed control and a slow speed control, means controlled by the position of said back gage for transferring from said high speed to said slow speed control a predetermined distance in advance of said stop point, means for decelerating said back gage at a predetermined substantially constant rate during said transfer, and means operable while said back gage is moving forwardly at slow speed for stopping the same accurately with said material at said predetermined point.

17. Work advancing mechanism of the character described which comprises a work receiving table, a back gage movable relative to said table, hydraulic means for actuating said back gage on a work advancing stroke, and control means for said hydraulic means for metering the flow of fluid to said hydraulic means at a predetermined rate to establish controlled deceleration of said work advancing movement thereof.

18. A spacer mechanism for advancing work material toward a working position comprising a work table, a back gage movable relative to said work table to advance the work material thereon and on a return stroke of movement, reversible hydraulic power actuating means for moving said back gage forwardly and rearwardly, and control means for said power actuating means including a plurality of stops in independently spaced relation corresponding to a pattern of movement of said back gage, means movable in direct relation to movement of said back gage for engaging said stops, and means controlled by said stops for selectively stopping, starting and reversing said hydraulic means to correspondingly operate said back gage in a continuous series of separate movements.

19. In a machine of the character described for operating on material, the combination of a work table, a back gage movable across said work table, drive means for actuating said back gage, sensing means actuated in accordance with the position of said back gage on said table, an electric control circuit for controlling the operation of said drive means, a relay in said circuit to control the starting of said drive means, and means for bypassing said relay and for opening said circuit directly in response to actuation of said sensing means in a predetermined position of said back gage to stop said drive means and said back gage accurately in a predetermined position on said work table.

20. In a machine of the character described for operating on material, the combination of a work table, a back gage movable across said work table, drive means for actuating said back gage, an electric control circuit for controlling the operation of said drive means, a relay in said circuit to control the starting of said drive means, means responsive to the position of said back gage on said work table, switch means controlled by said position responsive means, and means operable in the stopping of said drive means for shifting control of said circuit from said relay to said switch means to provide for direct control of said circuit by said switch means and the accurate stopping of said back gage at a predetermined position on said table.

21. In a machine for handling sheet material of the character described, a work table, a back gage movable over said work table, a hydraulic motor for moving said back gage, a source of pressure fluid for operating said motor, a metering valve for controlling the rate of supply of fluid to said motor, and means for connecting said metering valve to move in coordinated relation with said back gage as said back gage decelerates to meter said fluid flow at a predetermined and uniformly diminishing rate to obtain substantially constant deceleration of said back gage.

22. In a machine for handling sheet material of the character described, a work table, a back gage movable over said work table, a hydraulic motor for moving said back gage, a source of pressure fluid for operating said motor, a metering valve for controlling the rate of supply of fluid to said motor, a variable ratio linkage mechanism for connecting said metering valve to move in coordinated relation with said back gage as said back gage decelerates to meter said fluid flow at a predetermined and uniformly diminishing rate to obtain substantially constant deceleration of said back gage.

23. In a spacer mechanism having a work table, a power operated back gage and sensing means movable in relation to the travel of said back gage, the combination of a rotatable head, means for rotatably supporting said head, a plurality of stop bars adapted to be removably supported on said head in cooperative relation with said sensing means, and means for individually adjusting said stop bars longitudinally relative to said head to establish predetermined operative relation with said sensing means.

24. In a spacer mechanism having a work table, a power operated back gage and sensing means movable in relation to the travel of said back gage, the combination of a rotatable head, means for rotatably supporting said head, a plurality of stop bars adapted to be removably supported on said head in cooperative relation with said sensing means, a drive motor for rotating said head, a friction coupling for transmitting the drive torque of said motor to said head, removably positioned stop pins circumferentially spaced around said head in corresponding relation to the spacing of said stop bars, and releasable means for engaging each successive stop pin to stop the rotation of said head following a fractional part of a revolution thereof to bring successive stop bars into operative position.

25. In a spacer mechanism having a work table, a power operated back gage and sensing means movable in relation to the travel of said back gage, the combination of a turret head, means for rotatably supporting said turret head, a plurality of stop bars adapted to be removably supported on said turret head in cooperative relation with said sensing means, a drive motor for rotating said turret head, a friction coupling for transmitting the drive torque of said motor to said turret head, removably positioned stop pins circumferentially spaced around said turret head in corresponding relation to the spacing of said stop bars, releasable means for engaging each successive stop pin to stop the rotation of said turret head following a fractional part of a revolution thereof to bring successive stop bars into operative position, and means for maintaining said drive motor in operation for, and terminating its operation after, a complete cycle of operation thereof.

26. A control bar for use in conjunction with a control carriage having a sensing means which comprises an elongated rod, means for removably mounting said rod in operative relation with respect to said sensing means, a plurality of stops each having a control surface for actuating said sensing means, and means carried by said stops and removable therewith for separately mounting each of said stops on said rod for independent assembly and removal thereof without affecting the setting of any of the other stops thereon.

27. A control bar for use in conjunction with a control carriage having sensing means thereon selectively responsive to stops in different planes which comprises an elongated rod, a standard stop, means for adjustably mounting said standard stop on said rod in predetermined position for cooperation with said sensing means, and means for mounting a second stop on said standard stop and in a different plane therefrom to effect a different predetermined cooperation with said sensing means.

28. A control bar for use in conjunction with a control carriage having a sensing means which comprises an elongated rod, means for removably mounting said rod in operative relation with respect to said sensing means, said rod having a flat surface adapted to be brought into direct contact with the work material, a plurality of stops for cooperative relation with said sensing means when said rod is assembled in operative position, means operable while said flat surface of said rod is in contact with the work for securing said stops on said rod in direct relation to the pattern on said work material, said stops having the control surface thereof closely adjacent said flat surface of said rod providing for direct application of the rod and stop thereon to the surface of the work for presetting the stop positions.

29. A control bar for use in conjunction with a control carriage having a sensing means which comprises an elongated rod, means for removably mounting said rod in operative relation with respect to said feeler arm, said rod having a flat surface adapted to be brought into direct contact with the work material, a plurality of stops for cooperative relation with said sensing means when said rod is assembled in operative position, each said stop also having a flat face substantially flush with said flat surface and an edge adapted to be aligned with the work, and means operable while said flat surface of said rod is in contact with the work for securing said stops on said rod in direct relation to the pattern on said work material.

30. In a spacer mechanism for handling material of the character described having a work table, a power operated back gage and sensing means movable in relation to the travel of said back gage, the combination of a rotatable head, means for rotatably mounting said head in predetermined relation to said work table, a plurality of stop bars, means for removably supporting said stop bars upon said head to be sequentially brought into an operative position, and a plurality of stops adapted to be mounted on each of said bars in predetermined spaced relation thereon for cooperative relation between said sensing means and the stops on the bar which is in said operative position.

31. A spacer mechanism as defined in claim 30 including means operable automatically in response to completion of a cycle of movement of said back gage for rotating said head to advance a successive stop bar into the operative position thereof.

32. A control bar for use in conjunction with a control carriage having a sensing means comprising an elongated rod, means for removably mounting said rod in operative relation with respect to said sensing means, said rod having a flat surface adapted to be brought into direct contact with the work material, a plurality of stops for cooperative relation with said sensing means when said rod is assembled in operative position, means operable while said flat surface of said rod is in contact with the work for securing said stops on said rod in direct relation to the pattern on said work material, said stops having the control surface thereof closely adjacent said flat surface of said rod providing for direct application of the rod and stop thereon to the surface of the work for presetting the stop positions, and index means on said rod adapted to be located in direct relation to the margin of the work.

33. In a cutting machine including a reciprocating knife and a back-gauge, means for stepping said back-gauge to a plurality of preselected successive positions; said means including operating mechanism driving said back-gauge; means responsive to the completion of the movement of the knife to initiate said operating mechanism; a plurality of adjustable stops and a stop engaging member movable with said back-gauge; means responsive to the engagement of said stop engaging member with one of said stops to decelerate said operating mechanism and said back gauge through an infinitely variable diminishing speed to a halt.

34. In a cutting machine including a reciprocating knife and a back-gauge, means for stepping said back-gauge to a plurality of preselected successive positions; said means including operating mechanism driving said back-gauge; means responsive to the completion of the movement of the knife to initiate said operating mechanism; a plurality of adjustable stops and a stop engaging member movable with said back-gauge; means responsive to the engagement of said stop engaging member with one of said stops to halt said operating mechanism.

35. In a cutting machine including a reciprocating knife and a back-gauge, means for stepping said back-gauge to a plurality of preselected successive positions; said means including operating mechanism driving said back-gauge; means responsive to the completion of the movement of the knife to initiate said operating mechanism; a plurality of adjustable stops and a stop engaging member movable with said back-gauge; means responsive to the engagement of said stop engaging member with one of said stops to decelerate said operating mechanism and said back gauge to a halt.

36. In apparatus of the character described, a back gauge; means for advancing the back gauge step by step to a plurality of successive preselected positions; a plurality of adjustable stop members individually settable to determine individual preselected positions; a stop engaging member movable in accordance with the movement of said back gauge and cooperating with successive stops to halt the back gauge advancing means successively in accordance with the position of successive stops; means operable after the halting of the back gauge by one stop to remove said stop from intercepting relation with said stop engaging member and to bring the next stop into the path of movement of said stop engaging member.

37. In apparatus of the character described, a back gauge; means for advancing the back gauge step by step to a plurality of successive preselected positions; a plurality of adjustable stop members individually settable to determine individual preselected positions; a stop engaging member movable in accordance with the movement of said back gauge and cooperating with successive stops to halt the back gauge advancing means successively in accordance with the position of successive stops; means operable after the halting of the back gauge by one stop to remove said stop from intercepting relation with said stop engaging member and to bring the next stop into the path of movement of said stop engaging member; said stop engaging member being linearly movable; said stops being moved successively into the line of movement of said stop engaging member.

WILLIAM R. SPILLER.

References Cited in the file of this patent

UNITED STATES PATENTS

| Number | Name | Date |
|---|---|---|
| 1,180,088 | Taylor et al. | Apr. 18, 1916 |
| 1,678,156 | Mulroney | July 24, 1928 |
| 1,743,421 | Brackett | Jan. 14, 1930 |
| 1,805,128 | Brackett | May 12, 1931 |
| 2,095,308 | Brackett | Oct. 12, 1937 |
| 2,122,221 | Valiquette | June 28, 1938 |
| 2,198,732 | Langenhagen | Apr. 30, 1940 |
| 2,487,031 | Seybold | Nov. 1, 1949 |

OTHER REFERENCES

Seybold (Reissue) 19,172, May 22, 1934.